(12) United States Patent
Pollock

(10) Patent No.: US 6,733,662 B2
(45) Date of Patent: May 11, 2004

(54) METHODS AND APPARATUS FOR BIOLOGICAL TREATMENT OF WASTE WATERS

(75) Inventor: David Pollock, Calgary (CA)

(73) Assignee: V.A.I. Ltd., Calgary (CA)

( * ) Notice: Subject to any disclaimer, the term of this patent is extended or adjusted under 35 U.S.C. 154(b) by 236 days.

(21) Appl. No.: 10/083,995

(22) Filed: Feb. 25, 2002

(65) Prior Publication Data

US 2002/0162795 A1 Nov. 7, 2002

Related U.S. Application Data

(60) Provisional application No. 60/271,201, filed on Feb. 23, 2001.

(51) Int. Cl.⁷ .............................. C02F 3/20; C02F 3/30
(52) U.S. Cl. .................. 210/97; 210/188; 210/202; 210/150; 210/151; 210/532.1; 210/220; 210/143; 210/197; 210/196; 210/194
(58) Field of Search .................. 210/188, 101, 210/137, 194, 197, 196, 220, 143, 532.1, 150, 151, 202, 97

(56) References Cited

U.S. PATENT DOCUMENTS

| | | | |
|---|---|---|---|
| 4,253,949 A | 3/1981 | Hines et al. | 210/703 |
| 4,340,484 A | 7/1982 | Pollock et al. | 210/607 |
| 4,425,231 A | 1/1984 | Fujimoto et al. | 210/96.1 |
| 5,645,726 A | 7/1997 | Pollock | 210/626 |

FOREIGN PATENT DOCUMENTS

| | | |
|---|---|---|
| EP | 0 990 622 A2 | 4/2000 |
| JP | 56 118799 A | 9/1981 |

*Primary Examiner*—Chester T Barry
(74) *Attorney, Agent, or Firm*—Graybeal Jackson Haley LLP

(57) ABSTRACT

In a vertical shaft bioreactor, improved devices and methods are provided for enhanced secondary and/or tertiary treatment of wastewater, including residential, municipal and industrial wastewater. The devices and methods of the invention are useful for enhanced secondary wastewater treatment, including BOD and TSS removal. Tertiary treatment can alternately or additionally be achieved in the bioreactor with nitrification of ammonia, with nitrification and denitrification, and with nitrification, denitrification, and chemical phosphorus removal. A vertical shaft bioreactor is also provided which achieves thermophilic aerobic digestion and pasteurization of sewage sludges, optionally to produce class A biosolids.

41 Claims, 12 Drawing Sheets

40 CFR 503 Class A Time and Temperature Requirements for Solids Less Than 7%

US 6,733,662 B2

METHODS AND APPARATUS FOR BIOLOGICAL TREATMENT OF WASTE WATERS

CROSS REFERENCE TO RELATED APPLICATIONS

This application claims the benefit of U.S. Provisional Application No. 60/271,201, filed Feb. 23, 2001.

TECHNICAL FIELD

The present invention relates to methods and devices for wastewater treatment. More specifically, the invention relates to vertical shaft bioreactor wastewater treatment apparatus and methods for operating and constructing same.

BACKGROUND OF THE INVENTION

High efficiency wastewater treatment has become increasingly important as the world's population continues to grow. The quantity of water needed for human consumption and other uses has increased at a rapid pace, while the amount of naturally available water remains unchanged. The ever-increasing demand for usable, clean water has made reclamation of wastewater an essential component of growth and development of human populations.

In the United States and other developed nations, as existing metropolitan areas become overcrowded, developers are encouraged or required to construct new housing in previously undeveloped areas. Many of these undeveloped areas lack sufficient water for consumption, irrigation and similar purposes, necessitating reclamation and reuse of available water resources. For development in these areas to be successful, sewage from the residential use of water, commonly referred to as wastewater, is therefore a primary target for reclamation.

Residential wastewater has a high water content, but requires substantial processing before it can be reused because of the human waste and other contaminants mixed with it. To achieve reclamation of residential wastewater in many new development areas, isolated from existing sewage treatment facilities, on-site wastewater treatment and reclamation is highly advantageous or essential.

A wide variety of different wastewater treatment systems have been proposed for reclaiming residential sewage and other categories of wastewater. One such system disclosed in U.S. Pat. No. 2,528,649, incorporates a simple sedimentation tank for separating solid waste, or "sludge", from wastewater. After sedimentation, the sludge is passed to a digestion system where it is allowed to settle so that clear aqueous liquid separates from the sludge. The clarified liquid is redirected back to the sedimentation tank. Unfortunately, this system suffers from a number of shortcomings that make it inefficient. In particular, the system incorporates a relatively crude sedimentation system that merely allows the influent sewage to separate and does not aerate or facilitate processing of the sewage in any other way.

A number of wastewater treatment processes comprise "biological" systems utilizing microorganisms contained in an activated biomass, or sludge for the removal of COD, phosphorous and/or nitrogen from wastewater. These treatment processes typically incorporate multiple treatment phases or "zones", namely: (1) a preliminary treatment area; (2) a primary treatment area; and (3) a secondary treatment area. Preliminary treatment is primarily concerned with the removal of solid inorganics from untreated wastewater. Typically, this preliminary treatment encompasses a two-stage treatment process in which the debris is removed by screens and/or settling. Organic matter is carried out in the fluid stream for subsequent treatment. Primary treatment entails a physical process wherein a portion of the organics, including suspended solids such as feces, food particles, etc. is removed by flotation or sedimentation. Secondary treatment typically encompasses a biological treatment process where microorganisms are utilized to remove remaining organics, nitrogen and phosphorous from the wastewater fluid stream. Microorganism growth and metabolic activity are exploited and controlled through the use of controlled growth conditions.

In large scale municipal or industrial applications, biological treatment processes typically utilize a basin or other reservoir in which the wastewater is mixed with a suspension of biomass/sludge. Subsequent growth and metabolism of the microorganisms, and the resultant treatment of the wastewater, is carried out under aerobic and/or anaerobic/anoxic conditions. In most large scale municipal or industrial treatment systems, the various components of the treatment process are performed in discrete basins or reactors. As such, there is a continuous flow of the wastewater from one process step to the next. Biomass containing the active microorganisms may be recycled from one process step to another. The conditioning of such biomass to enhance growth of particularized subgroups of microorganisms possessing a proclivity for performing a specific type of metabolic process, e.g. phosphate removal, nitrogen removal has been the subject matter of numerous patents, including: U.S. Pat. No. 4,056,465; U.S. Pat. No. 4,487,697; U.S. Pat. No. 4,568,462; U.S. Pat. No. 5,344,562. The optimization of other components or aspects of biological wastewater treatment has also engendered a variety of patents, including: U.S. Pat. No. 2,788,127; U.S. Pat. No. 2,875,151; U.S. Pat. No. 3,440,669; U.S. Pat. No. 3,543,294; U.S. Pat. No. 4,522,722; U.S. Pat. No. 4,824,572; U.S. Pat. No. 5,290,435; U.S. Pat. No. 5,354,471; U.S. Pat. No. 5,395,527; U.S. Pat. No. 5,480,548; U.S. Pat. No. 4,259,182; U.S. Pat. No. 4,780,208; U.S. Pat. No 5,252,214; U.S. Pat. No. 5,022,993; U.S. Pat. No. 5,342,522; U.S. Pat. No. 3,957,632; U.S. Pat. No. 5,098,572; U.S. Pat. No. 5,290,451; Canadian Patent # 1,064,169; Canadian Patent # 1,096,976; Canadian Patent # 1,198,837; Canadian Patent # 1,304,839; Canadian Patent # 1,307,059; Canadian Patent # 2,041,329.

Biological removal of organic carbon, nitrogen and phosphorus compounds from waste water requires attention to special environmental conditions within the processing equipment. For instance, for bacteria and other microbes to convert organic carbon compounds (measured as BOD) to carbon dioxide and water, a well mixed aerobic environment is required. Approximately one pound of oxygen is required for each pound of BOD removed. To convert nitrogen compounds to nitrogen gas and carbon dioxide, nitrosomas and nitrobacter operate in an aerobic environment consuming inorganic carbon. Approximately 4.6 pounds of oxygen is required for each pound of ammonia-N converted to nitrate-N (assuming alkalinity is sufficient). Subsequently, facultative bacteria operate in an anoxic environment consuming organic carbon and liberating nitrogen gas. Approximately 2.6 pounds of oxygen is recovered for each pound of nitrate-N converted to nitrogen gas. To biologically tie up phosphate in the cell mass, an anaerobic step to produce volatile fatty acids is required. This is followed by Poly P microbes consuming large amounts of phosphorus required to metabolize the volatile fatty acids in an aerobic environment thus concentrating the phosphate in the biomass (see, e.g., Abstract by Dr. W. Wilson Western Canada Water and Wastewater Conference Calgary AB. January 2002.)

The combination of these many biological processes ideally results in a Biological Nutrient Removal (BNR) process, sometimes called tertiary treatment. However, a well-designed tertiary treatment operation requires coordination and sequencing of a complex assemblage of components, processes and conditions. Each of the constituent biological processing steps proceeds at its own rate, with specific environmental parameters required. Efficient tertiary processing also requires the correct amounts of specialty microbes to sustain the microbial populations and perform specific processing functions.

Current wastewater treatment systems which attempt to provide tertiary treatment include Upflow Sludge Bed Filter (USBF), Sequencing Batch Reactor (SBR) and Membrane Separation Activated Sludge (MSAS) systems. The Sequencing Batch Reactor (SBR) process is a modification of the conventional activated sludge process. U.S. Pat. No. 5,503,748 discloses a long vertical shaft aerator applied to the SBR technology. The SBR process employs a number of discrete steps, typically comprising sequential fill, reaction, settlement and decantation of wastewater with biomass in an enclosed reactor. In the initial step of this process, wastewater is transferred into a reactor containing biomass, and combined to form a mixed liquor. In the reaction step of the treatment process the microorganisms of the biomass utilize and metabolize and/or take up the nitrogen, phosphorous and/or organic sources in the wastewater. These latter reactions may be performed under anaerobic conditions, anoxic conditions, aerobic conditions, or a combination thereof to manipulate organism growth, population dynamics and contaminant processing. The length of this stage will be dependent on the waste's characteristic, concentration of the biomass, and other factors. Following the reaction cycle, the biomass in the mixed liquor is allowed to settle out. A sludge blanket settles on the bottom of the reactor leaving a treated effluent supernatant. The treated and clarified wastewater (i.e. effluent) is subsequently decanted and discharged. The reactor vessel is then refilled and the treatment process cycle reinitiated. Thus, the sequencing batch reactor's process is based on discrete operation in time, whereas other wastewater treatment processes are based on distinct operations in space, e.g., by performance of different reactions in separate vessels.

A number of additional wastewater treatment designs feature an air-lift reactor, which is a mechanically simple, combined gas-liquid flow device characterized by fluid circulation in a defined cyclic pattern through a set of specifically designed channels. Fluid motion is due to the mean density difference in an upflow (riser) and downflow (downcomer) sections of the reactor. The air-lift reactor is ordinarily comprised of distinct zones with different flow patterns. The riser is typically the zone where the gas is injected creating a fluid density difference, resulting in upward flow of both liquid and gas phases. At the top of the reactor, there is a gas-liquid separator section, which is typically a region of horizontal fluid flow and flow reversal where gas bubbles disengage from the liquid phase. The downcomer is the zone where the gas-liquid dispersion or degassed liquid ordinarily recirculates to the riser. The downcomer zone exhibits either single-phase, two-phase cocurrent, or two-phase mixed cocurrent-countercurrent downward flow, depending on whether the liquid velocity is greater than the free-rise velocity of the bubbles. The base section at the lower end of the vessel communicates the exit of the downcomer to the entrance of the riser.

The air-lift reactor has predominantly been used for microorganism fermentation processes such as the ICI single cell protein production. Nonetheless, a number of systems are known which utilize air-lift reactors for wastewater treatment. Among these examples is the Betz reactor (Gasner, Biotech. Bioeng. 16:1179–1195, 1974), and "deep shaft" bioreactors for effluent treatment (see, e.g., Hines et al., Chem. Eng. Sym. Ser. U.K. 41:D1–D10, 1975).

Following the original development of deep shaft bioreactor technology, recent efforts have led to improvements in long vertical shaft bioreactor systems for wastewater treatment. Among these improvements, U.S. Pat. Nos. 4,279,754, 5,645,726, and 5,650,070 issued to Pollock each disclose a modified vertical shaft bioreactor system for the treatment of biodegradable wastewater and/or sludge. Generally, these vertical shaft bioreactor systems comprises a bioreactor, a solid/liquid separator and intervening apparatus in communication with the bioreactor and separator. The bioreactor comprises a circulatory system which includes two or more vertical, side-by-side or coaxial chambers, a downflow chamber (downcomer) and an upflow chamber (riser). These chambers are connected at their upper ends through a surface basin and communicate at their lower ends via a common "mix zone" adjacent the lower end of the downcomer.

In addition to the mix zone, these reactors feature a "plug flow zone" located below the mix zone and communicating therewith. As previously described, the term "plug flow" has referred to a net downward migration of solid particles from the mix zone toward an effluent outlet located at the lower end of the reactor. In one application to sludge digestion the net downward migration has been reported by Guild et al. (Proceedings WEF conf., Atlanta Ga., October 2001), to include local back mixing only, but over extended periods of operation (e.g., about 16 hours), inter-zonal mixing occurs.

The waste-containing liquor ("mixed liquor") is driven through the circulating system (i.e., between the downflow and upflow chambers, the surface basin and the mix zone) by injection of an oxygen-containing gas, usually air, near the bottom of the reactor (e.g., at the mix zone and plug flow zone). A portion of the circulating flow is directed to the plug flow zone and is removed at the lower end thereof as effluent. In wastewater treatment reactors, the air is typically injected 5–10 feet above the bottom of the reactor and, optionally, immediately below the lower end of the downcomer. The deepest air injection point divides the plug flow zone into a quasi plug flow zone with localized back mixing above the deepest point of air injection, and a strict plug flow zone with reportedly no mixing below the deepest point of air injection.

At start-up of the bioreactor, air is injected into the riser in the nature of an air lift pump, causing liquor circulation between and through the upflow and downflow chambers. Fluid in the downcomer has a higher density than the liquid-bubble mixture of the riser and thereby provides a sufficient lifting force to maintain circulation.

Once the bioreactor circulation is thus initiated, all of the air injection is diverted to the mix zone and/or plug flow zone. The air bubbles that rise out of these zones are trained into the upflow chamber and are excluded from the downflow chamber where the downward flow of liquor exceeds the rise rate of the bubbles. Dissolved oxygen in the circulating mixed liquor is the principal reactant in the biochemical degradation of the waste. As the liquor ascends in the riser to regions of lower hydrostatic pressure, this and other dissolved gases separate and form bubbles. When the liquid/ bubble mixture from the riser enters the basin, gas disengagement occurs. To facilitate this purpose, the surface basin is ordinarily fitted with a horizontal baffle at the top of the upflow chamber to force the mixed liquor to traverse a major part of the basin and release spent gas before re-entering the downflow chamber for firther treatment.

U.S. Pat. No. 5,650,070 discloses a process where influent waste water is introduced at depth into the riser chamber through an upwardly directed outlet arm of an influent conduit. A zone of turbulence is created at the lower end of the downflow chamber by the turn-around velocity head as the circulating flow reverses from downward to upward flow. This mix zone is not well defined but typically is between 15–25 feet deep. A portion of the mixed liquor in the mix zone flows downwardly into the top of the plug flow zone in response to an equal amount of treated effluent being removed from the lower end of the plug flow zone into an effluent line, as discussed above. During operation of the bioreactor the flow of influent liquor to and effluent liquor from the bioreactor are controlled in response to changes in level of liquid in the connecting upper basin.

Reaction between waste, dissolved oxygen, nutrients and biomass (including an active microbial population), substantially takes place in an upper circulating zone of the bioreactor defined by the surface basin, the upflow and downflow chambers and the mix zone. The majority of the contents of the mix zone circulate upwardly into the upflow chamber. In this upflow chamber undissolved gas, mostly nitrogen, expands to help provide the gas lift necessary to drive circulation of the liquor in the upper part of the reactor. The spent gas is released from the liquor as it traverses the horizontal baffle in the surface basin. The plug flow zone located below the upper circulating zone provides a final treatment or "polish" to the mixed liquor flowing downward from the mix zone to effluent extraction at the lower end of the reactor.

The injected oxygen-containing gas dissolves readily under pressure in the liquor in the plug flow zone where there is localized back mixing resulting in a slow net downward movement of liquor. Undissolved gas (bubbles) migrate upward to the very turbulent mix zone under pressure. The gas to liquid transfer in this zone is very high, reaching overall reactor oxygen transfer efficiencies in excess of 65%. The products of the reaction are carbon dioxide and additional biomass which, in combination with unreacted solid material present in the influent wastewater, forms a sludge (or biosolids).

In addition to aerobic digestion of BOD, it is becoming more and more important to couple biological nutrient removal (BNR) of nitrogen and phosphorous compounds with conventional wastewater treatment. As the demand for higher quality liquid effluent discharges increase, the need for technologies as provided by the present invention has become increasingly more compelling. The old Secondary Biological treatment standard of 30 mg/L BOD and 30 mg/L TSS is no longer adequate in many jurisdictions and limits are now often placed on nitrogen and phosphorus as well. Effective removal of these nutrients is essential in view of existing and developing environmental laws aimed at preventing eutrophication of natural waters and the attendant ecosystem damages that result therefrom.

In basic terms, nitrogen removal is accomplished by converting ammonia contained in a mixed liquor stream to nitrites and nitrates, in the presence of oxygen, which is known as an aerobic nitrifying stage. Ammonia conversion to nitrite is carried out by microbes known as Nitrosomonas, while the conversion of nitrite to nitrate is accomplished by Nitrobacters. Nitrate conversion to nitrogen gas occurs in an anoxic denitrifying stage that takes place in a suspended growth environment devoid of dissolved oxygen. Nitrogen, carbon dioxide and water is produced, with the gas being vented from the system. Nitrification rates can be optimized by regulating interdependent waste stream parameters such as temperature, dissolved oxygen levels (D.O.), pH, solids retention time (SRT), ammonia concentration and BOD/TKN ratio (Total Kjeldahl Nitrogen, or TKN, is organic nitrogen plus the nitrogen from ammonia and ammonium). Higher temperatures and higher dissolved oxygen levels tend to promote increased nitrification rates, as does pH levels in 7.0 to 8.0 range. Sludge retention times of from 3.5 to 5, and preferably 5–8, days dramatically increase nitrification efficiency, after which time efficiencies tend to remain constant. Increases in ammonia concentration increases the nitrification rate but only to a maximum level attainable after which further ammonia concentration increases do less to increase the rate of nitrification. Rates have also been shown to be maximized at BOD/TKN ratios of less than 1.0 (see, e.g., Abstract by Dr. W. Wilson, Western Canada Water and Wastewater BNR conference, Calgary AB Canada January 2002]].

Physical/Bio-Chemical phosphorous removal typically requires an anaerobic suspended growth zone at the start of the system, and a sludge fermentation tank to supply volatile fatty acids (VFA's) for the energy needs of the phosphorous ingesting organisms (Acinetobacters). Recently it has been reported that anaerobic force mains can generate sufficient volatile acids to premit substantial biological phosphorus removal.

Refractory treatment and polishing stages may be added to the process, downstream of the final clarification stage. In many waste streams, the majority of organic compounds (80%–90%) are easily biodegraded. The remaining fraction biodegrade more slowly and are termed "refractory" compounds. Prior art biological nutrient removal designs incorporate a single sludge and a single clarifier, for example, U.S. Pat. No. 3,964,998 to Barnard, but in that case the overall oxidation rate of the system has to be reduced to satisfy the slowest compound to oxidize.

Biological nutrient removal (BNR) systems can take various process configurations. One such embodiment is the five stage Modified BardenphoTM process, which is based upon U.S. Pat. No. 3,964,998 to Barnard. It provides anaerobic, anoxic and aerobic stages for removal of phosphorous, nitrogen and organic carbon. More than 24 BardenphoTM treatment plants are operational, with most using the five stage process as opposed to the previously designed four stage process. Most of these facilities require supplemental chemical addition to meet effluent phosphorous limits of less than 1.0 mg/L. Plants using this process employ various aeration methods, tank configurations, pumping equipment and sludge handling methods. WEF Manual of Practice No. 8, "Design of Municipal Wastewater Treatment Plants", Vol. 2, 1991.

In the context of vertical bioreactor technology, Pollock (U.S. Pat. No. 5,651,892, issued Jul. 29, 1997, incorporated herein by reference) discloses an innovative process utilizing a vertical bioreactor linked to a flooded filter via a flotation separator. According to this design, improved reaction rates are achieved by separating the biomass into a high rate aerobic organic carbon removal step, followed by an aerobic nitrification step using a separate nitrifying biomass. These steps are then followed by a high rate denitrification step in an anoxic environment created by feeding influent and return mixed liquor or effluent into that zone to provide a source of organic carbon and consume the oxygen.

Incorporation of an anaerobic processing step for phosphate removal is typically done in a separate reactor—due to the long fermentation time required for volatile fatty acid production. Furthermore, phosphorus removal in single mixed liquor systems is difficult to implement because the phosphate rich biomass produced in the aerobic portion of the process should not contact the anaerobic fermentation reactor product due to the risk of re-solubilizing the entrapped phosphate. In other instances, biological phosphorus removal is augmented by addition of metal salts such as ferric chloride or alum. These can be added directly into the aerobic zone of the reactor to chemically bind the phosphate.

Thus, a variety of treatment systems, including coupled vertical shaft reactors and SBR's, have been successfully used to provide tertiary wastewater treatment. However, these tertiary treatment systems involve a single mixed liquor process wherein all of the specialty microbes involved in the process are mixed together. These include autotrophic organisms that utilize energy from inorganic material (e.g., the nitrifiers Nitrosomonas and Nitrobacters), and heterotrophs which utilize organic energy sources and include the aerobic BOD removers and the Acinetobacter biological phosphorous removers (Bio-P organisms). Therefore, in all of these types of systems, the rate of treatment is controlled by the slowest performing microbe, usually nitrosomas which converts ammonium to nitrite. Due to the slow overall rate of treatment, these single mixed liquor systems are called extended aeration systems and are quite energy intensive.

Despite the foregoing developments and advancements in wastewater treatment technologies, there remains an urgent need in the art for improved wastewater treatment systems that can satisfy a broadened range of uses and perform expanded and enhanced functions not satisfied by existing wastewater treatment systems. For example, there is a long unmet need in the art for a simplified wastewater treatment process and apparatus that provides enhanced biological nutrient removal (BNR) and which, in certain embodiments, can produce class A bio-solids required for unrestricted land applications. In addition, there remains an unfulfilled need for wastewater treatment systems and methods that satisfy these expanded functions while minimizing the costs and environmental impacts that attend conventional wastewater treatment plant installation and operation.

Surprisingly, the present invention satisfies these needs and fulfills additional objects and advantages which will become apparent from the following description and appended drawings.

SUMMARY OF THE INVENTION

The invention satisfies these needs and fulfills additional objects and advantages by providing an improved vertical shaft bioreactor and related methods for wastewater treatment that is adapted, inclusive of the optional and secondary features and process steps, to provide enhanced secondary and/or tertiary treatment of wastewater, including residential, municipal and industrial wastewater.

The devices of the invention can be constructed, configured with secondary features, or adjusted, to achieve enhanced secondary wastewater treatment, including a very high degree of BOD and TSS removal.

The present invention provides devices and methods capable of treating residential waste water from a human population of 5,000—in a building about the size of a medium sized bungalow. This result may be achieved by devices and methods that produce recycle quality water, class A biosolids, and a clean odorless off gas.

Alternately or additionally, enhanced secondary treatment can be achieved in the same bioreactor along with nitrification of ammonia (conversion of ammonia to nitrate).

In other alternate embodiments, enhanced secondary treatment is provided along with nitrification and denitrification (removal of ammonia and nitrate) in a bioreactor of the invention.

In still other devices and methods of the invention, enhanced secondary wastewater treatment in the bioreactor is accompanied by nitrification, denitrification, and chemical phosphorus removal (tertiary treatment). At lower loading rates, some biological phosphorus removal is expected in the anaerobic primary downflow channel due to the presence of attached growth of anaerobic bacteria and the very slow downward circulation rate achieveable with this invention. Anaerobic biological slime has been found growing on the downflow channel wall of a similar reactor, under certain load conditions.

In yet additional embodiments of the invention, a vertical shaft bioreactor is constructed and employed in novel designs and methods to achieve thermophilic aerobic digestion and pasteurization of sewage sludges, optionally including production of class A biosolids.

Additional embodiments and further detailed aspects of the invention are provided herein, which are set forth in detail in the following description and appended drawings.

| | Preliminary treatment |
|---|---|
| A | Fine screens |
| B | Solids hopper-Screenings and washed grit |
| C | Hyrdaclone degritter |
| | Waste water BNR treatment as described herein |
| D | Deoxygenation unit [channel 32 + 40] |
| E | Denitrification [head tank 16] |
| F | Anoxic/anaerobic unit [channel 12] |
| G | Aerobic unit [zone 1 channel 80] |
| H | Nitrification [zone 2 head tank, 110 and 82] |
| I | Sedimentation clarifier [120] |
| J | Waste activated sludge float thickener |
| K | Alum or ferric chloride feeder |
| L | Process air compressor |
| | Recycle quality water [units required by law] |
| M | Flocculating tank |
| N | Cloth disk filter |
| O | Chlorination |
| P | Ultraviolet disinfection |
| Q | Backwash pump |
| | Thermophilic aerobic digestion as described herein class A biosolids |
| R | Zone 1 thermophilic aerobic digester |
| S | Zone 2 |

-continued

| T | Acid feeder |
|---|---|
| U | Polymer feeder |
| V | Centrifuge de-watering |
| W | Flotation cell |
| X | Air compressor |
| Y | Off gas collection system |
| Z | Class A bio-solids collection |

DESCRIPTION OF THE SPECIFIC EMBODIMENTS

As illustrated in the attached Figures, the instant invention provides a long vertical shaft bioreactor 10 for wastewater treatment. The bioreactor of the invention shares a number of structural and functional characteristics with previously described vertical shaft bioreactor systems (see, e.g., U.S. Pat. Nos. 4,279,754, 5,645,726, and 5,650,070 issued to Pollock, each incorporated herein by reference), but departs in several important and novel aspects therefrom.

Figure 1:
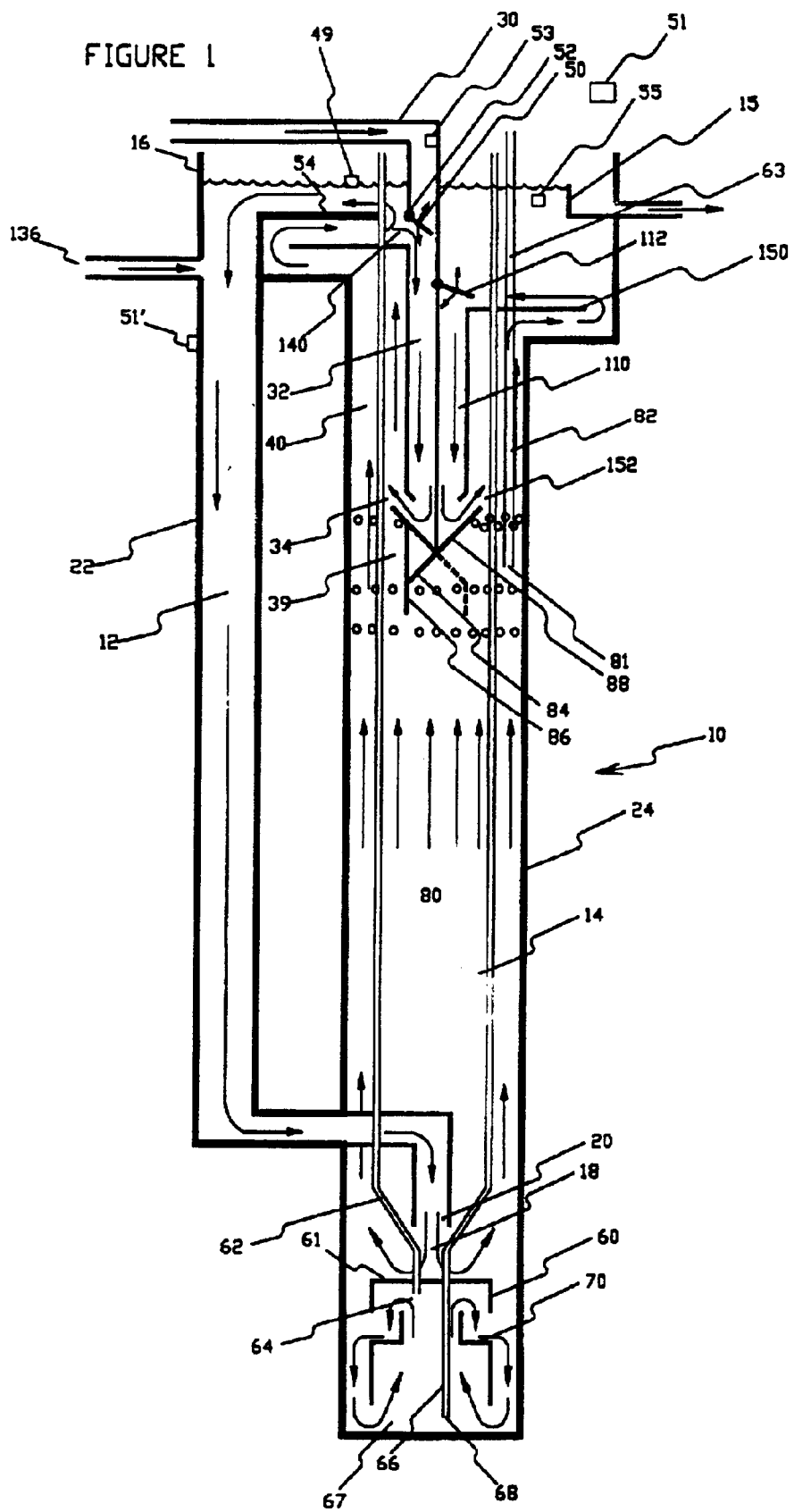
FIG. 1 is a diagrammatic vertical section through one embodiment of a bioreactor according to the invention for use in waste water treatment.

In reference to FIG. 1, the vertical shaft bioreactor 10 of the invention features a wastewater circulation system which includes two or more substantially vertical channels, including at least one downflow channel, or downcomer channel 12, fluidly interconnected in a circuitous, open or closed, path with at least one upflow channel, or riser channel 14. The downcomer and riser channels are typically interconnected at their upper ends via a surface basin or head tank 16, which may be open or closed, and at a lower junction corresponding to a mix zone 18 situated below a lower port or aperture 20 of the downcomer.

The downcomer 12 and riser 14 channels are typically defined by separate conduits, for example by separate, cylindrical-walled pipes. Alternatively, they may be defmed as interconnected compartments or channels sharing one or more walls, for example as parallel channels separated by partitioning structures (e.g., radial partitions or septa) within an elongate, compartmentalized reactor vessel or frame. The downcomer and riser channels are preferably oriented substantially parallel to one another, for example in a side-by-side or coaxial relative configuration.

Typically, the downcomer 12 and riser 14 channels are defined as separate conduits over at least a portion of their lengths. In one example, the downcomer channel is defined by a separate, cylindrical-walled downcomer conduit (e.g., a steel pipe) 22 nested coaxially within a larger diameter, cylindrical walled riser conduit 24 (which will often correspond to an outer wall or casing of the entire bioreactor assembly). As such, the attached Figures are generally to be interpreted as schematic illustrations, wherein for ease of illustration the drawings which show the downcomer conduit laterally displaced relative to the riser conduit are intended also to schematically illustrate an alternative, parallel or coaxially nested configuration of the downcomer conduit within the larger riser conduit.

In one embodiment of the invention adapted for residential use, the wastewater treatment bioreactor 10 of the invention is constructed to service a small residential community of about 5,000 population. Typically, two parallel bioreactors are installed in accordance with EPA redundancy requirements, in vertical in-ground shafts bored using conventional drilling technology. In various embodiments, the bioreactor of the invention can be constructed, configured with secondary features, or adjusted to provide the secondary and/or tertiary levels of treatment, listed below.

a) Secondary treatment (BOD and TSS removal) only.
b) Secondary treatment with nitrification of ammonia (conversion of ammonia to nitrate).
c) Secondary treatment with nitrification and denitrification (removal of ammonia and nitrate).
d) Secondary treatment with nitrification, denitrification, and chemical phosphorus removed (tertiary treatment). Some biological phosphorus removal will occur at low loads.
e) Thermophilic aerobic digestion and pasteurization of sewage sludges to produce class A biosolids.

In brief reference to the following description, the secondary treatment of a) above may be completely aerobic both in the zone 1 head tank 16 and downcomer channel 12 of zone 1, and in the zone 2 upflow channel(s) 82 and head tank 15. This configuration requires a shaft of about 30 inches diameter and 250 ft. deep, a zone 1 head tank of about 6 ft. diameter×10 ft. deep and a concentric zone 2 head tank of about 12 ft. diameter×10 ft. deep. The concentric clarifier is about 28 ft. diameter×10 ft. deep and is fitted with a rake mechanism to assist in sludge removal. In more detailed embodiments, this reactor will treat residential sewage from at least a 2,500 member human population and produce <30 mg/L TBOD and <30 mg/L TSS.

The secondary treatment process of b) is also completely aerobic and of the same general dimensions as a) except the zone 2 head tank is about 16 ft. in diameter. A larger portion of the air originating at the bottom of zone 1 is diverted into zone 2 using a diverter mechanism 84. The treatment system of c) above is designed for anoxic conditions in the head tank and downcomer of zone 1. In certain embodiments, this reactor will treat residential sewage from at least a 2,500 member human population and produce <1 mg/L ammonia-N, <15 mg/L TBOD, and <15 mg/L TSS.

Only a small fraction of air from the lower portion of zone 1 is diverted into the zone 1 upflow channel(s) 40. In addition to raw influent feed in the upper end of zone 1, recycled nitrified effluent or return activated sludge from the clarifier or, alternatively from zone 2 head tank, is added to the raw influent to create the anoxic conditions.

In this treatment process the reactor is enlarged to approximately 36 inches in diameter, zone 1 head tank is increased to about 8 ft. diameter, zone 2 head tank is increased to about 16 ft. in diameter. The concentric clarifier has an outside diameter of about 30' and is fitted with a rake mechanism. In more detailed embodiments, this process will treat residential sewage from a human population of 2,500 or greater to <5 mg/L TKN, <10 mg/L TBOD, and <10 mg/L TSS.

The treatment system of d) above is the same general dimension of c). Within the treatment process of d), alum of ferric chloride may be added into zone 2 for chemical precipitation of phosphorus. It is usually uneconomic to use only a biological phosphorus removal process alone to achieve a high degree of phosphorus removal (e.g., 2–3 mg/L residual) on small plants, since a pre-fermentation step to produce volatile fatty acids (VFA) may be required. Typical characteristics of effluent from this plant are: TBOD<10 mg/L; TSS<10 mg/L; TN<5 mg/L; PO4<1 mg/L.

In the case of sludge treatment e), the reactor is reconfigured such that zone 1 surrounds zone 2, or may be adjacent to zone 2 throughout the major portion of the reactor length and zone 2 head tank 15' surrounds the zone 1 head tank 16'. Zone 1 and zone 2 are hydraulically connected at the bottom of zone 2 through a self batching air lock device which precludes zone 1 contents from entering zone 2 while processing each batch. The thermophilic aerobic digester volume of configuration e) is about one half the volume of the wastewater treatment reactor producing the biomass. Because sludge storage provision is more economic to build than redundancy in reactors, only one digester is required for two treatment reactors. Accordingly the small town of about 5000 people requires 2 treatment reactors and 1 sludge digester all of the same size. The foregoing example is a typical design for small communities of about 5000 people.

Since about 80% of the voidage (air lift) occurs in the top 80–100 ft. of any air lift reactor, the superior channels can be effective between 150 and 50 feet deep, preferably 80–88 ft. which is the standard length of two joints of double random length pipe. Off the shelf air compressors are readily available in 100, 125 and 150 psi models corresponds to shaft depth of 200, 250 and 300 ft. Although airlift bioreactors have been built between 60 ft. and 500 ft. depths, a more common range is 150 to 350 ft. depth and a range of 200 ft. to 300 ft. is now most common.

Conventional water well rigs can drill holes up to about 48 inches and deep foundation equipment for pilings can drill up to about ten feet in diameter. Augers (where geology permits) can drill up to about 20-ft. diameter but are limited to about 200-ft. depth. Mined shafts can be up to 30 ft. diameter and of virtually any depth.

Small municipal plant reactors (5000 population) will typically be placed with conventional water well rigs and preferably be about 24 to 48 inches in diameter.

Larger communities (10,000–50,000 population) may require shafts of 5 to 10 ft. diameter×200 ft. depth placed by deep foundation piling machines and augers, whereas very large industrial plants (e.g. pulp mills) may require shafts placed by mining techniques.

The long vertical shaft bioreactor 10 of the invention receives influent, typically wastewater or sludge, through an influent conduit 30 which introduces the influent into an influent channel 32. The influent flows downward to the bottom of the influent channel, where it exits through a shielded influent port 34 and combines with upflow in a zone 1 upflow channel 40 delineated at its lower end by the influent port. The influent port is upturned or otherwise shielded to prevent admission of bubbles from below the zone 1 upflow channel from entering the influent channel.

In alternate embodiments of the invention, the influent channel 32 can optionally accept recycle flow of liquor from the head tank 16 portion of zone 1 of the bioreactor 10. This flow is regulated by a zone 1 recycle flow regulator 50, for example a manual or motor-actuated baffle, valve or other flow-regulating apparatus. In this context, the influent flow through the zone 1 recycle regulator 50 is ordinarily throttled via an influent flow throttling control mechanism. This can include, for example, a system control unit 51 (e.g., a system control microprocessor) operatively linked to a valve or baffle actuator 52 and an optional flow sensor 53 or 53' for determining influent and/or zone 1 recycle flow or alternatively dissolved oxygen DO probe 49 to monitor oxygen levels. Control of influent flow through the regulator functions in part to adjust the air lift in zone 1 upflow channel 40 and facilitate gravity influent flow. The combined flow in the zone 1 upflow channel contains some anoxic air bubbles (see below) and is therefore lighter than the fluid in influent channel 32, and rises. By anoxic air bubbles is meant bubbles predominately containing gasses other than useable oxygen. Flow in the zone 1 upflow channel 40 traverses a horizontal degas plate 54 and descends substantially free of entrained bubbles in the downcomer channel 12 under gravity and enters the main riser channel 14 in the vicinity of the mix zone 18, where it is intensively aerated.

At start up of the bioreactor 10, compressed air or other oxygen-containing gas or, alternatively, a liquid/gas solution or suspension, is delivered to a lower segment of the reactor to serve as an oxygenation source for aerobic waste processing in the bioreactor. Typically, compressed air is delivered to a sparger or air distribution header 60 anchored near the bottom of the riser channel 14 below the lower port of the downcomer channel 12 that serves to deliver the process air in a substantially dispersed array. Typically, the distribution header is flat topped or cone shaped with an optional, serrated skirt fixed to the perimeter underside. The header serves to disperse the process air in a substantially uniform, circular array of air bubbles that emerge as a rising curtain of bubbles from around the periphery of the header—below the lower port 20 of the downcomer channel and surrounding the mix zone 18. The mix zone is thus generally defined in one embodiment of the invention as the lower portion of the riser channel below and surrounding the lower port of the downcomer channel and above and surrounding the air distribution header. The flow from the downcomer channel impinges on an upper surface 61 of the distribution header and is partially deflected upward. At the same time, bubbles released from the periphery of the header mix with the flow from the downcomer channel and contribute to turbulent mixing of this material, which thereby becomes less dense as a fluid-bubble mixture than the fluid in the downcomer channel. Accordingly, the resultant fluid-bubble mixture rises within the riser channel 14 to establish circulation in this portion of the bioreactor having the general circulatory pattern indicated by the arrows in FIG. 1.

The compressed air or other oxygen-containing gas or liquid serving as the oxygenation source for the bioreactor 10 is typically delivered through one or more dedicated oxygenating lines, typically compressed air lines 62. A dedicated compressed air line is connected to a compressed air supply at the surface and runs downward parallel to the riser channel (e.g., nested within the riser conduit 24) extending to an oxygenation port, typically an air delivery port 64, that opens in fluid connection with the riser channel 14. The air delivery port 64 is generally positioned beneath the air distribution header 60 to release the compressed air for dispersal by the header, as described above. Within certain embodiments of the invention, compressed air (or other oxygen-containing gas or liquid) is optionally, or additionally, delivered within the bioreactor by a dual-service aeration/solids extraction line 66. Functioning of this line can be controlled, e.g., by a system control unit 51 as described above, to optionally deliver compressed air or other oxygen-containing gas or liquid and, in a second operation mode, serve as a waste solids extraction line 66 to purge waste solids from a sump 67 portion of the reactor located at the bottom of the riser channel. The waste solids extraction line extends from the surface (e.g., from a surface-located, waste-solids extraction/flotation reservoir) to a aeration/waste solids extraction port 68 opening in fluid connection with the sump. Solid particles that settle into the sump will accumulate over a period of hours of operation. For the majority of the bioreactor's operation time, the aeration/solids extraction line is continuously purged by flow of compressed air, and therefore the sump 67 is substantially mixed and aerated and forms a functional part of the mix zone 18. Periodically, the aeration/extraction line can be depressurized, whereby settled solids within the sump will rush to the top of the reactor to be purged therefrom. These solids are highly aerated, well stabilized (odor free) and because of the high gas content will spontaneously float to a thickened sludge.

In related embodiments of the invention, the improved vertical shaft bioreactor 10 features two simultaneously-operating aeration lines or ports to enhance the formation of small, dispersed bubbles to generate upflow currents and supply process air within the bioreactor. The use of two aeration lines is exemplified by the dedicated compressed air line 62 and dual-function aeration/solids extraction line 66, which each operate at least for a majority of the bioreactor process time in a compressed air delivery mode. In this mode, the two lines in concert provide a cooperative, multiple source compressed air injection mechanism of the invention, which serves to enhance the turbulence and small bubble-forming capacity within the mixing zone 18 of the reactor, which is in turn expanded by the cooperation of multiple compressed aeration lines or ports. In one aspect of this enhanced mixing/bubble forming mechanism, a first aeration line opening, exemplified by the air delivery port 64 of dedicated air line 62, is positioned below the air distribution header 60 and above a second aeration line opening, exemplified by aeration/extraction port 68 of the dual-function aeration/solids extraction line. Compressed air released from this lower aeration port stimulates fluid mixing and bubble formation near the bottom of the riser channel 14 to set up a first circulation path or vector. The resultant circulating fluid-bubble mixture impinges upwardly and/or transversely against mixed fluid and bubbles generated by the introduction of compressed air from the first, upper air line 62. This results in increased shear forces and the production of smaller air bubbles in an enlarged mixing zone, compared to the results achieved by operation of a single aeration line (see, FIG. 1).

In conjunction with the above-described use of a cooperative, multiple source compressed air circulation regime, certain embodiments of the invention incorporate a modified (typically stepped, chambered, or baffled) header, or a multi-component header complex, to augment the enhanced mixing/bubble forming mechanism provided by multiple, interactive aeration sources. In one aspect, a second, cooperating shear header 70 is mounted within the riser chamber 14 below the main bubble distribution header 60 and works in conjunction with two, vertically tiered aeration sources generally as described above. The shear header can be any flow diverting or channeling device that enhances an upward and/or transverse or radial flow component within the mixing zone generated by a second, lower-positioned aeration source (exemplified by the aeration/solids extraction port 68). In one exemplary embodiment, the shear header comprises an internally stepped draught tube (FIG. 1) attached by vertical struts to the underside of the distribution header. Compressed air fed into the aeration/solids extraction line 66 causes an air lift effect in the stepped draught tube, thus establishing a separate circulation pattern or vector in the lower portion of the mix zone as shown in FIG. 1. This upward and/or transverse or radial circulating flow impinges against mixed fluid and bubbles generated by the introduction of compressed air from the first, upper air line 62 near the perimeter of the distribution header, which interaction is regulated in part by air delivered though the aeration/solids extraction port, while the balance of process air is delivered though the dedicated air delivery port 64. This creates very high flow rates inside the serrated skirt in increased shear at the perimeter of the distribution header which aids substantially in shearing bubbles to a smaller size. Whereas previous bioreactors typically generate bubbles at the site of distribution in the range of about a half inch to three quarters of an inch in diameter, the novel interactive flow mechanism and cooperative header design of the invention generates substantially smaller bubbles, typically about one quarter to one half inch, often less than one quarter inch, down to as small as one-fifth to one-eighth inch or less in diameter. For example, studies published in the water Enviornment Research Journal May/June 1999 pgs. 307–315 (incorporated herein by reference) determined that bubbles about 2mm are the optimum diameter for mixing and oxygen transfer. However bubbles of this size do not form naturally at an orifice without some mechanism for shearing the bubble. The bubble size is determined when the buoyancy force equals the attraction forces at the orifice and bubble size is not necessarily a function of orifice size. Since bubbles of this size range have a rise rate of about 0.8–1.0 ft./sec. in water, a downward circulation velocity of greater than 1 ft./sec. in the vicinity of the serrated skirt 60 will cause the bubble to be sheared from the orifice. The circulation velocity is regulated by the amount of air injected in line 68 and can be adjusted independently of the air being applied at orifice 64. Samples extracted periodically in line 66 can be measured for dissolved oxygen. The circulation velocity between aerator elements 60 and 70 can be adjusted to maximize the oxygen transfer. This novel design provides enhanced mixing and bubble distribution without unacceptable risk of clogging. When the aeration/solids extraction line is being used for biomass wasting, air-flow in the dedicated air line maintains reactor circulation. At this point, when the aerator barrel of the shear header is depressurized a new batch of waste biomass transfers from the mix zone 18 to the sump and aeration of biomass within the aeration barrel of the shear header begins again.

Yet additional embodiments of the invention are distinguished by virtue of their novel features for channeling, circulating, and segregating fluid, air and/or biomass within the reactor 10. These features are in turn variable, combinable in alternative reactor configurations, and/or adjustable within additional aspects of the invention—allowing use or modification of the reactor for different wastewater treatment applications and results. In general aspects, the bioreactor of the invention features a first treatment or processing "zone" designated zone 1, wherein the majority (e.g., greater than 80%, up to 90–95% or greater) of the primary reaction between waste, dissolved oxygen, nutrients and biomass (including an active microbial population), takes place. Within certain embodiments, this zone is defmed to include an upper circulating zone of the bioreactor comprising the surface basin or head tank 16, a primary reaction chamber 80 comprising a central volume of the riser channel 14, the downcomer channel 12, and the mix zone 18.

The majority of the contents of the mix zone 18 represent a fluid-bubble mixture that is less dense than the fluid in the downcomer channel 12 and therefore circulates upwardly from the mix zone into the primary reaction chamber 80. Undissolved gas, mostly nitrogen, expands to help provide the gas lift necessary to drive circulation of the liquor in the upper part of the reactor 10 in the patterns as shown by the arrows throughout the Figures. The products of this primary reaction are carbon dioxide and additional biomass which, in combination with unreacted solid material present in the influent wastewater, forms a sludge (or biosolids).

In certain embodiments of the invention, as illustrated in FIG. 1, upflow of fluid in the primary reactor channel 80 is segregated into multiple, smaller upflow channels in an upper section of the bioreactor 10. In one exemplary embodiment, upflow from the primary reactor channel is diverted into at least two discrete superior upflow channels, as exemplified by the zone 1 upflow channel 40 and a zone 2 (typically operated as a polishing zone) upflow channel 82 depicted in FIG. 1. In one exemplary construction design, flow diversion from the primary reactor channel into multiple, superior channels is achieved by employing a fixed or adjustable diversion plate 84 or comparable flow diverting device that is anchored near the top of the primary reactor channel.

The diversion plate 84 is configured and dimensioned to segregate the primary reactor channel 80 upflow into multiple superior channels. Typically, the diverter plate is configured and dimensioned to intercept and divert a larger fraction of total upflow volume of the fluid-bubble mixture from the primary reactor channel into a selected "aerobic" upflow channel, depending on the desired mode of operation of the bioreacter 10, as further explained below. In the exemplary embodiment shown in FIG. 1, the diverter plate features a vertical baffle 86 that facilitates segregation and channeling of the fluid-bubble mixture flowing upward in the primary reactor channel toward an upwardly angled, laterally or radially extending flow diverting extension 88 of the diverter plate that diverts a larger fraction of the total upflow volume of fluid and bubbles from the primary reactor channel into one or the other of the first zone upflow channel 40, or second zone upflow channel 82. Accordingly, a smaller fraction of the total upflow volume of fluid and bubbles is allowed to pass into the remaining superior upflow channel 40, thereby limiting as a primary process determinant the flow of aerated fluid into this remaining channel so as to contribute to generation of anoxic conditions in this channel, if desired.

Selection, positioning and adjustment of the flow diverter mechanism depends on the selected mode of operation of the bioreacter 10. In alternative embodiments, the diverter plate 84 can be positioned, shaped, dimensioned and/or adjusted to channel upflow of the fluid-bubble mixture from the primary reactor channel 80 into one or more superior channels to achieve higher aerobic environmental conditions in the selected channel(s), while limiting the upflow (particularly of high oxygen-containing fluid) into one or more superior channels selected for lower aerobic, even anoxic, environmental conditions. By way of example, the following steady state functionality of adjustable baffles 86 and 84 is described. In FIG. 1, 10 bubbles are depicted as rising uniformly at the top of zone 1 immediately below baffle 86. The baffle is adjusted so that 3 bubbles are segregated into area 39 and 7 are segregated into area 81. However the flow into area 81 is approximately equal to Q, influent/effluent flow+1.75 Q nitrated recycle flow=2.75 Q. In this exemplary design, the flow into area 39 is controlled to 5 Q. Therefore the flow per bubble in area 39 is 5/3=1.7 Q/bubble and in area 81 it is 2.75/7=0.4 Q/bubble. Similarly the oxygen demand and supply in the superior channels and head tanks can be calculated. Typically the average BOD in the area 39 and 81 is about 10 mg/L and the average ammonia-N concentration to be removed is 15 mg/L (after ammonia used in cell synthesis) and the denitrified recycle flow is 1.75 Q. Therefore the average ammonia concentration would be 15/1.75=8.57 mg/L. This level of ammonia-N is equal to 8.75 mg/L-Nx 4.6 # oxygen/# N=39 mg/L of BOD equivalent. The total load into zone 2 is therefore=2.75 Q [10+39]=134 Q oxygen units. Since there are 7 bubble oxygen units the load per bubble is 134/7=19 oxygen units required/bubble. Similarly the load into area 39 is 5 Q×10 mg/L BOD=50 Q oxygen units required. However in channel 40 above port 34 the load increases to 50 Q units+Q×200 units (assuming the influent BOD is 200 mg/L) for a total load of 250 Q units of oxygen required. Since there are only 3 bubble oxygen units available, the oxygen required per bubble is 250/3=83 oxygen units. Therefore the oxygen demand per bubble oxygen unit is higher in head tank 16 than in head tank 15 by 83/19=4.3 times. Consequently, if there is measurable dissolved oxygen in head tank 16 there will be surplus DO in head tank 15, and if there is surplus DO in head tank 16 there will substantially more DO at any level below baffle 86 down to the mix zone 18. Thus baffle 86 can be adjusted to accommodate a wide range of load and flow criteria.

Figure 2:
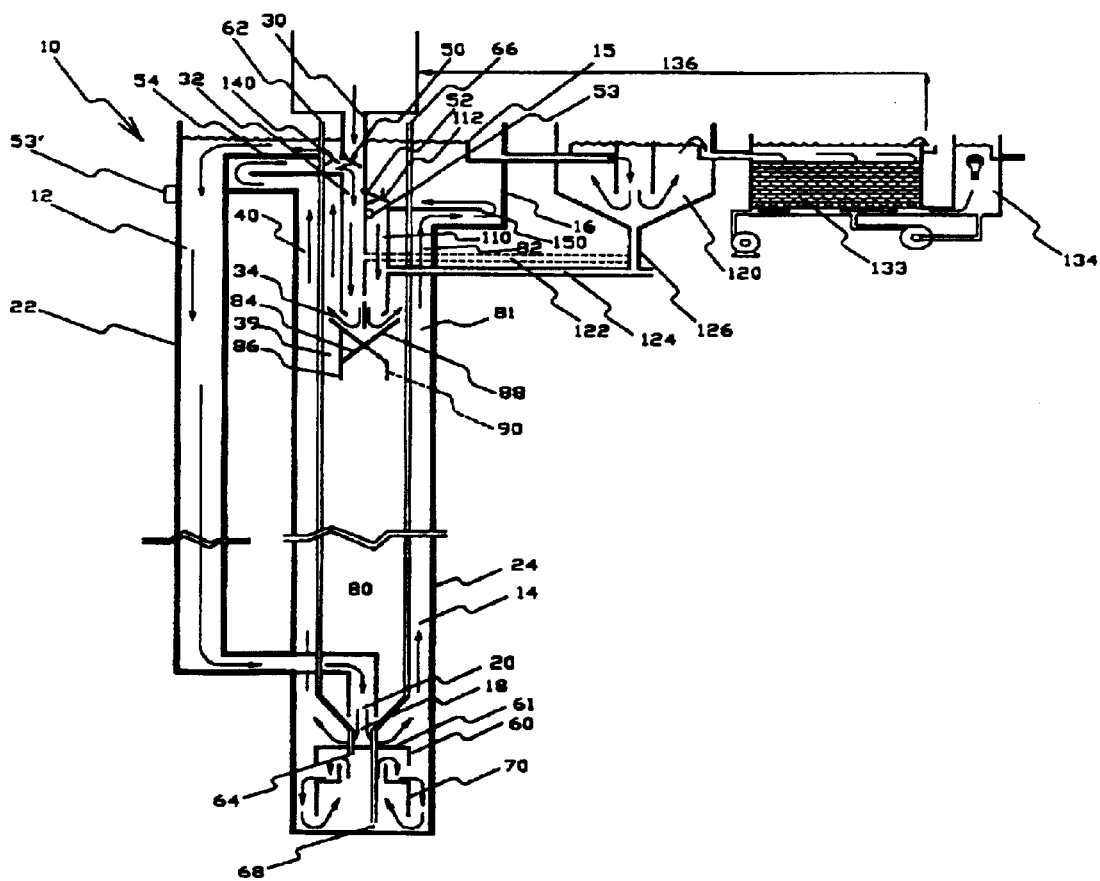
FIG. 2 is a diagrammatic vertical section through one embodiment of a bioreactor according to the invention for use in waste water treatment. This embodiment features a conventional sedimentation clarifier followed by an aerated polishing biofilter followed by an ultra violet light disinfection chamber and back wash tank.

Thus, in one aspect of the invention, the improved long vertical shaft bioreactor functions for multi-purpose waste treatment by providing aerobic digestion of BOD as well as single mixed liquor processing BNR treatment. Referring to FIG. 2, the flow diverter 84 is constructed and configured as shown (compare alternate diverter configuration/setting shown by phantom line 90) to divert a majority fraction of total upflow volume of the fluid-bubble mixture from the primary reactor channel into the zone 2 upflow channel 82, while limiting the upflow volume of fluid and bubbles from the primary reactor channel 80 into the zone 1 upflow channel 40. Volume ratio in influent channel 32 and flow down and into the zone 1 upflow channel (which intercepts only a small fraction of the bubbles from the primary reactor channel) can be finely controlled. Thus, a relatively small amount of air lift and a slow circulation rate can be provided the zone 1 upflow channel compared to the lift and circulation in the zone 2 upflow channel in this diverter configuration. The residence time of the fluid mixture in the zone 1 upflow channel is therefore increased, and the oxygen transfer capability in zone 1 upflow channel 40 is reduced due to the reduced bubble upflow. Notably, the bubbles in the zone 1 upflow channel are mostly nitrogen, because the oxygen is largely consumed in the lower and middle part of zone 1 (particularly including the mix zone 18 and the primary reactor channel 80 below the diverter).

Within this embodiment and adjustment/operation mode of the bioreactor 10, the superior channel referred to as the zone 1 upflow channel 40, can be selected to provide an anoxic environment, achieved in part by the low relative influx of oxygen and the high oxygen demand of the raw influent stream. This anoxic zone continues throughout the circulation path between the zone 1 upflow channel and the downcomer channel 12, as approximately indicated by the arrows in FIG. 2. Within this anoxic zone, a final step of BNR processing, denitrification of nitrate initially contained in the mixture of fluid in the zone 1 upflow channel, occurs. When this mixture, following the path indicated, reaches the mix zone 18, re-aeration of the anoxic flow exiting the lower downcomer port 20 occurs, and residual BOD that was not removed in the anoxic zone is oxidized in the lower part of zone 1 (including the mix zone and primary reactor channel 80). Thereafter, a portion of the uprising flow in the primary reactor channel flows upward into the zone 1 upflow channel 40, because this top portion of zone 1 is designed to be anoxic, the number of bubbles required for bio-oxidation is reduced. The airlift effect is also greatly reduced to slow the upflow in this part of the reactor. In addition, the ability to control influent flow via the zone 1 recycle flow regulator 50 also allows adjustment of air lift and flow in the zone 1 upflow channel.

Within the foregoing operation mode of the bioreactor 10, a major portion of the uprising air flow in the primary reactor channel 80 flows upward into the other superior upflow channel(s), exemplified by the zone 2 upflow channel 82. The relative lower liquid upflow fraction thus segregated includes the majority of bubbles originating at the lower end of zone 1 (e.g., bubbles generated by the dedicated air line 62 and optional multi-purpose aeration/waste solid extraction line 66, functioning in concert with the bubble distribution header 60 and optional shearing enhancer mechanism exemplified by the shear header 70). This active, fluid-bubble mixture segregated into zone 2 by operation of the diverter 84 enters the zone 2 upflow channel, then mixes with vigorous re-circulating flow entering zone 2 through a zone 2 recirculation channel 110 (which recycles liquor from the zone 2 head tank 15). This recirculation flow is optionally regulated by a zone 2 recirculation flow regulator 112, for example a manual or motor-actuated baffle, valve or other flow-regulating apparatus. This recycle flow regulator is also optionally controlled by the system control unit 51 (e.g., system control microprocessor) operatively linked to a valve or baffle actuator 52 and optional flow sensor 53 for determining zone 2 recycle flow).

When the bioreactor 10 is thus configured and/or adjusted for BNR removal, nitrification of mixed liquor can be efficiently conducted and controlled within zone 2 of the bioreactor, in accordance with the above-described construction and operation details. Some of the mixed liquor from zone 2 may be discharged to a detached 120 or integrated 120' solids-liquid separator (clarifier) (see, e.g., FIGS. 2–4, and 6). Some of the mixed liquor from zone 2 may be returned to the influent channel 32, where it undergoes de-nitrification, as described above, and the cycle repeats. Optionally, some clarified effluent may be returned to channel 32 during low flow periods, thereby removing more nitrogen compounds overall.

In more detailed embodiments of the invention, influent, return clarified effluent (e.g., recycled from a separate clarifier 120 or integrated clarifier 120'), and return activated sludge are combined in a preselected ratio to facilitate operation of the bioreactor 10. This can be achieve using various flow control features of the invention, and is facilitated in part by incorporation and controlled operation of a zone 1 activated sludge return channel 122 and a zone 2 activated sludge return channel 124 which receive activated sludge (e.g., via a sludge extractor line 126 connected to the clarifier) and direct the sludge into the zone 1 influent channel 32 or zone 2 recycle channel 110, respectively (see, e.g., FIGS. 2–4, and 8). Flow control within and between each of the illustrated feed, flow and drain lines and ports throughout the appended Figures is readily achieved using flow regulators 50 operatively interconnected with valve or baffle actuators 52 and/or flow sensors, all of which are operatively integrated and controlled by one or more system control unit(s) 52.

The selected mix ratio per volume of influent of typical municipal waste may be as high as 3 volumes of clarified effluent and 1 volume of return activated sludge to as low as 1 volume of clarified effluent and 1 volume of return activated sludge. Approximately 85% of total nitrogen will be converted to $N_2$ with 1.75 volumes of either clarified effluent or mixed liquor per volume of influent (see, e.g., Naohiro Taniguchi et al. report on air lift recirculation for nitrification and denitrification, R&D Division, Japan sewage works agency 1987, incorporated herein by reference.) It should be noted, however, that some industrial wastes may require 100 or more recycled volumes per volume of influent.

With respect to the nitrification process functions of the bioreactor 10, this can be further modified or enhanced by selection or adjustment of the various reactor features and operation parameters described above. In addition, the system can readily incorporate, or be coupled with, additional system features or components to enhance BNR process functions. Because the BOD is low in zone 2, growth of BOD-removing organisms is generally minimized, which allows nitrifying bacteria to dominate the biomass. In addition to this advantage, a substantial improvement in the rate of conversion of ammonium to nitrite and nitrate can also be realized by increasing the concentration of nitrifying bacteria. Since nitrifiers are attachment organisms, the provision of attachment sites in a mixed liquor in the form of sponge balls, suspended media, bits of small diameter plastic or rubber (elastomeric) polyethylene tubing, hanging strings of porous fabric in the liquor, etc., can be used quite effectively within the devices and methods of the invention (see, e.g., Keith Ganze "Moving Bed Aerobic Treatment" Industrial Waste Water November/December 1998, incorporated herein by reference.) For example, referring to FIG. 4, the BNR processes of the bioreactor can be substantially improved by including suspended media 130 that encapsulate or provide substrate for nitrifying bacteria within the recycling circulation path of zone 2 (see, also, T Lessel et al" Erfahrungen mit getauchten Festbettreaktorn fur die Nitrifikation" 38. Jahrgang, Heft 12/1991, Seite 1652 bis 1665, incorporated herein by reference), which modification is facilitated by the novel relative positioning and interzonal separation between zone 1 and zone 2. The moving bed media can be prevented from escaping in the effluent, for example by simple screens. Alternatively, fixed media 132 can be secured within in the head tank to increase the biomass of microorganisms adapted for BNR processing. These modifications yield a superior BNR performance. For example, the combination of a zone 2 regime that minimizes BOD-removing bacteria along with the increased attached growth biomass of nitrifying bacteria (e.g. 15–20 g/L equivalent nitrifiers) provides for highly effective BNR processing within the bioreactor of the invention. A single sludge extended aeration process typically contains 15–20% of nitrifying bacteria (by weight or population percentage of sludge mass). However, when attachment media are used within the present invention, the biomass of nitrifiers can be expanded up to greater than 30%, often up to 60–70%, as much as 75–85% or more of nitrifiers in the system population. This relates to the relative exhaustion of BOD in this process stage and zone of the system, as well as to the effective use of fixed or circulating attachment media within zone 2. These novel features and characteristics distinguish the modified single sludge system of the present invention from other single sludge processes.

Within additional aspects of the invention, a novel nitrification process is provided which relies substantially or entirely upon residual dissolved oxygen originating near the bottom of zone 1 as the source of oxygen to drive the process. Yet another important benefit and distinction that arises by using the unspent gases from zone 1 in this fashion is the high level of $CO_2$ available, which is also required by nitrifying bacteria as a source of inorganic carbon. In other nitrification systems, the primary inorganic carbon source depends on alkalinity of the wastewater and is typically determined by the presence of $CaCO_3$. The bioreactor process systems of the invention are therefore more compact and require less energy than current, extended aeration systems. Bioreactors constructed and operated according to the invention also produce a better quality biomass (including class A biosolids if desired) that is easier to separate from the mother liquor.

To further enhance the functions and operation of the bioreactor 10 of the invention, various coupled or integrated features can be incorporated with the bioreactor for enhanced processing of waste water. As illustrated in FIG. 2, the bioreactor according to the invention for use in waste water treatment may incorporate a conventional, stand-alone sedimentation clarifier 120. The bioreactor is further optionally fluidly connected with an aerated polishing biofilter 133 and/or an ultra violet light disinfection chamber 134 and/or back wash tank. In certain embodiments, line 136 returns backwash to the influent.

Figure 3:
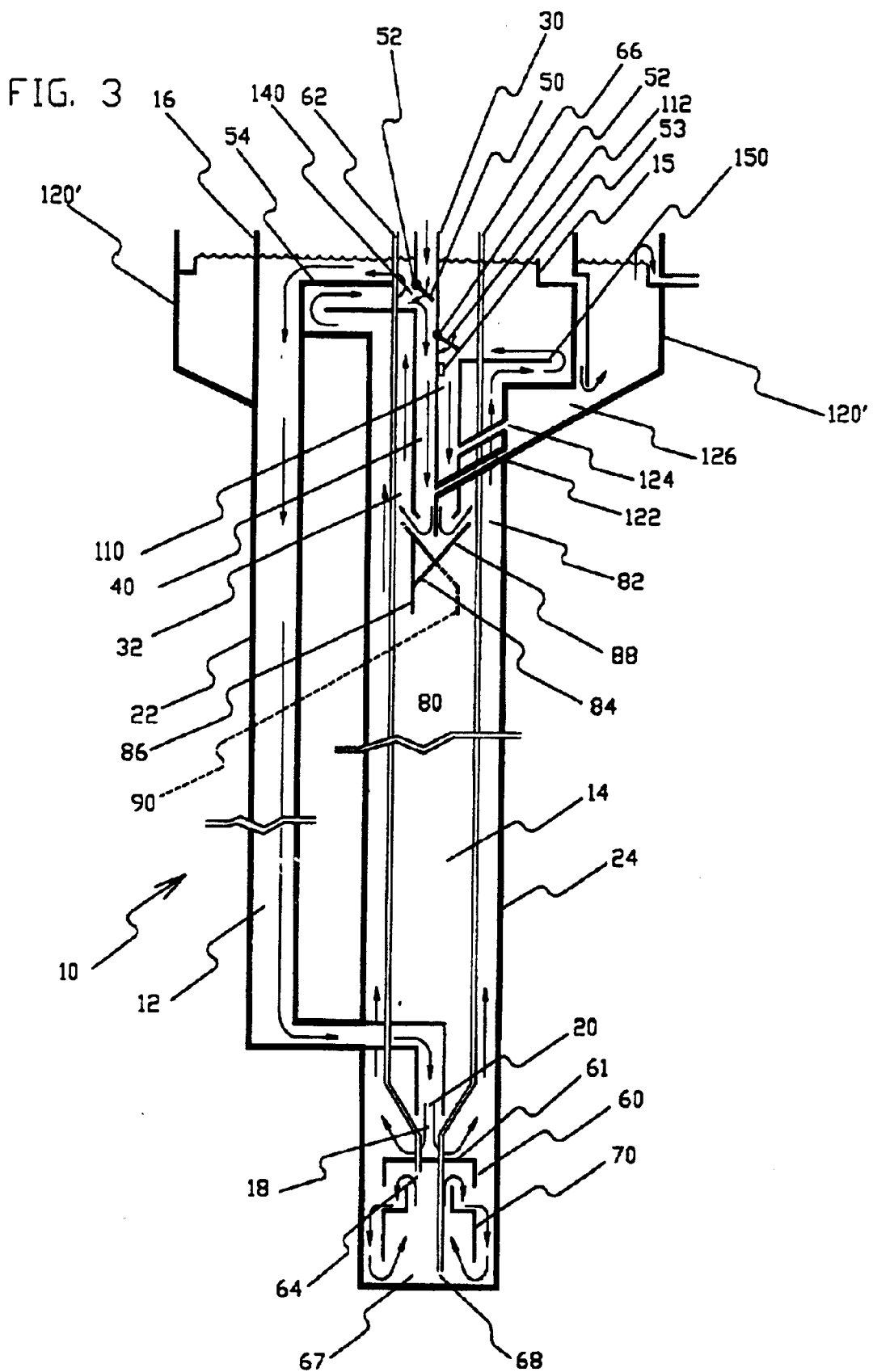
FIG. 3 is a diagrammatic vertical section through one embodiment of a bioreactor according to the invention for use in waste water treatment. This embodiment features an integrated circular sedimentation clarifier surrounding the circular zone 2 head tank which surrounds the circular zone 1 head tank. All three tanks being concentric with the vertical reactor. A provision is made to return settled activated sludge by gravity to either zone 1 or zone 2.
Figure 8:
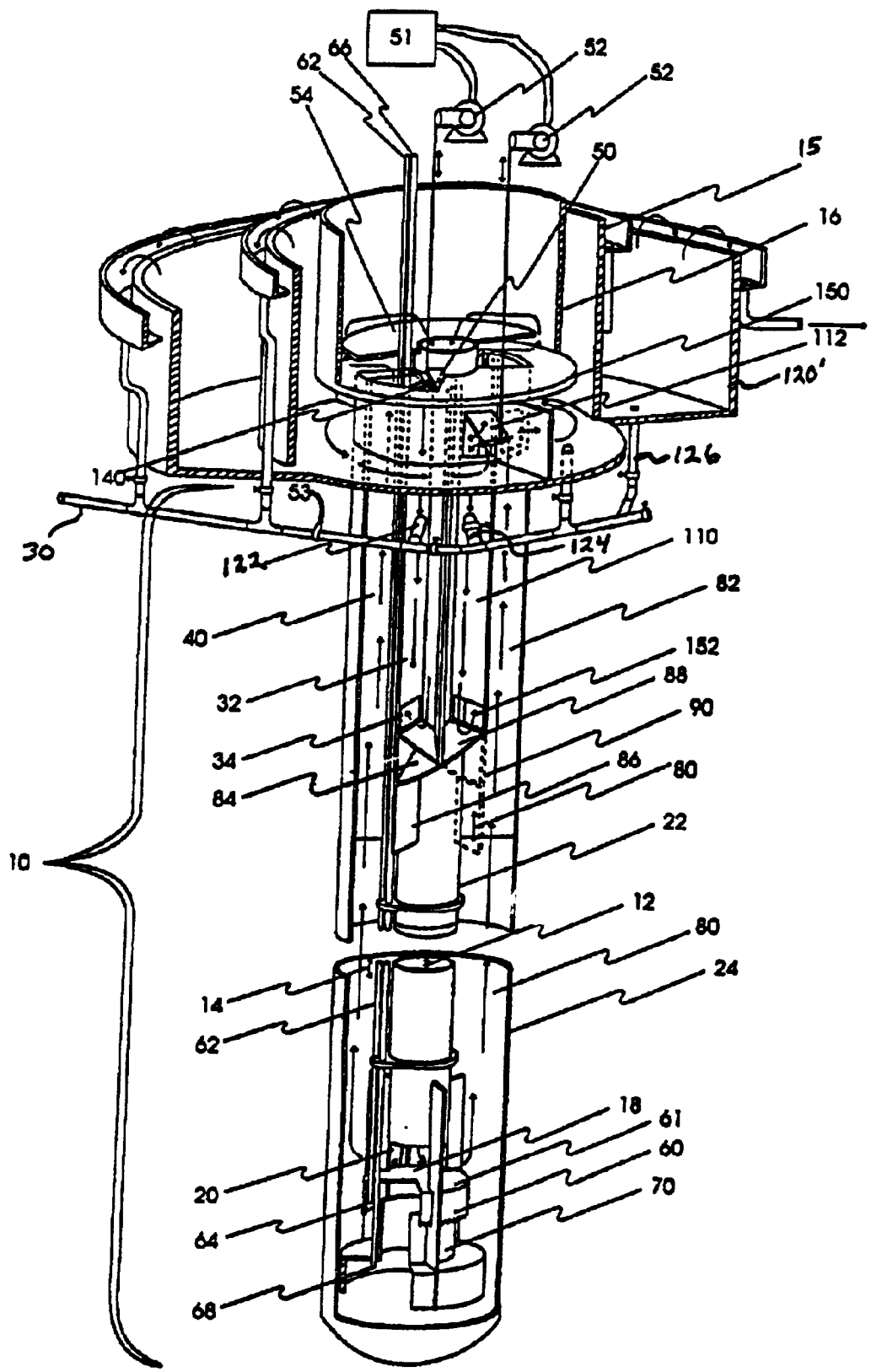
FIG. 8 is an isometric vertical section through one embodiment of the bioreactor according to the invention for use in waste water treatment. This section shows typical arrangement of various channels and the position of the aeration distribution header, zone 1 head tank, zone 2 head tank and an integral sedimentation clarifier.

Alternatively, FIGS. 3 and 8 (schematically and by partial sectional perspective views, respectively) illustrate an additional embodiment of the bioreactor 10 according to the invention—featuring an integrated circular sedimentation clarifier 120' surrounding a circular zone 2 head tank 15 which in turn surrounds a circular zone 1 head tank 16 (all three tanks being concentric in this vertical reactor). In these embodiments, settled activated sludge is returned by gravity to either zone 1 or zone 2.

Figure 4:
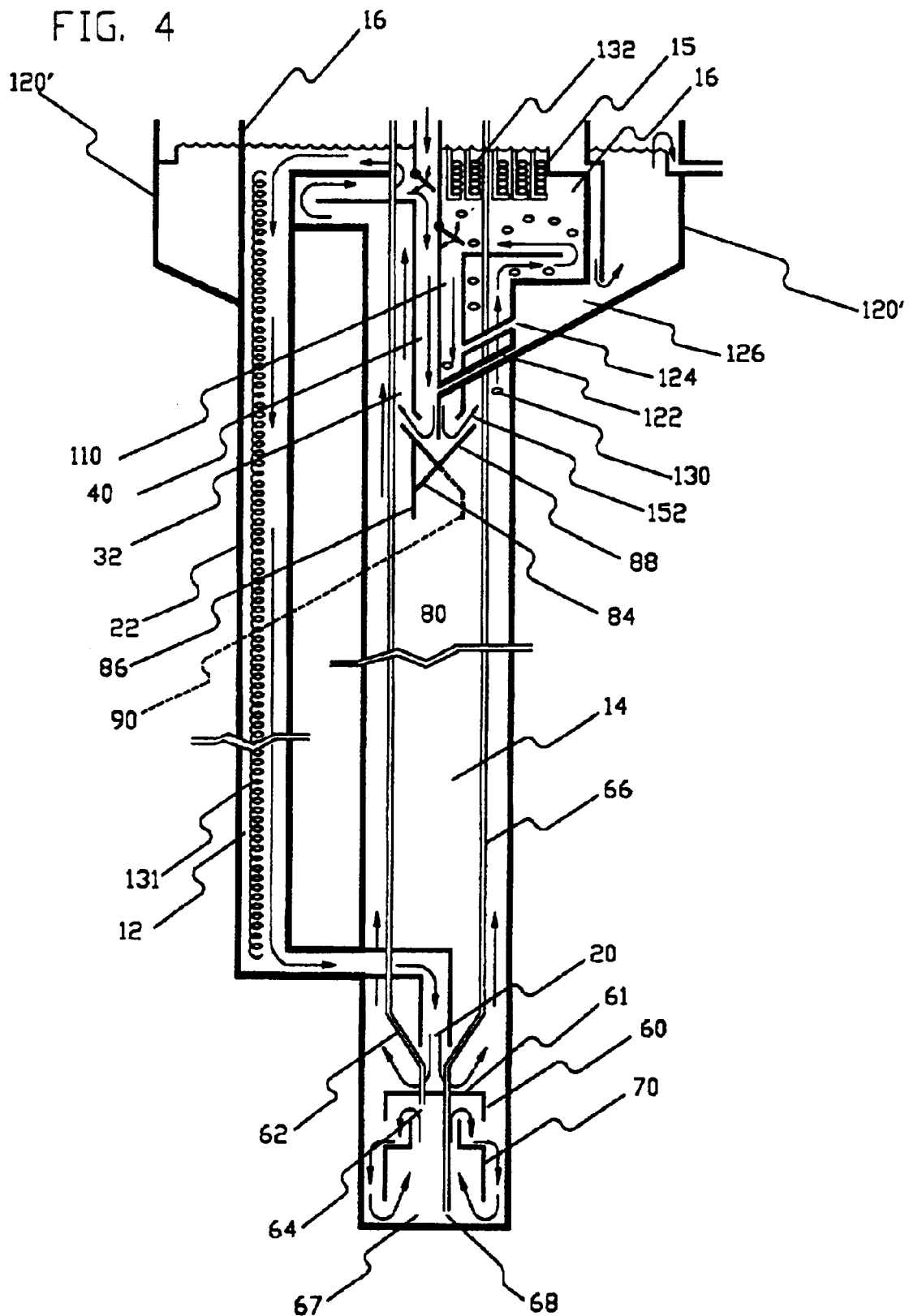
FIG. 4 is a diagrammatic vertical section through one embodiment of a bioreactor according to the invention for use in waste water treatment. This embodiment features moving bed media circulating in zone 2 or alternately fixed media suspended in the head tank of zone 2.
Figure 5:
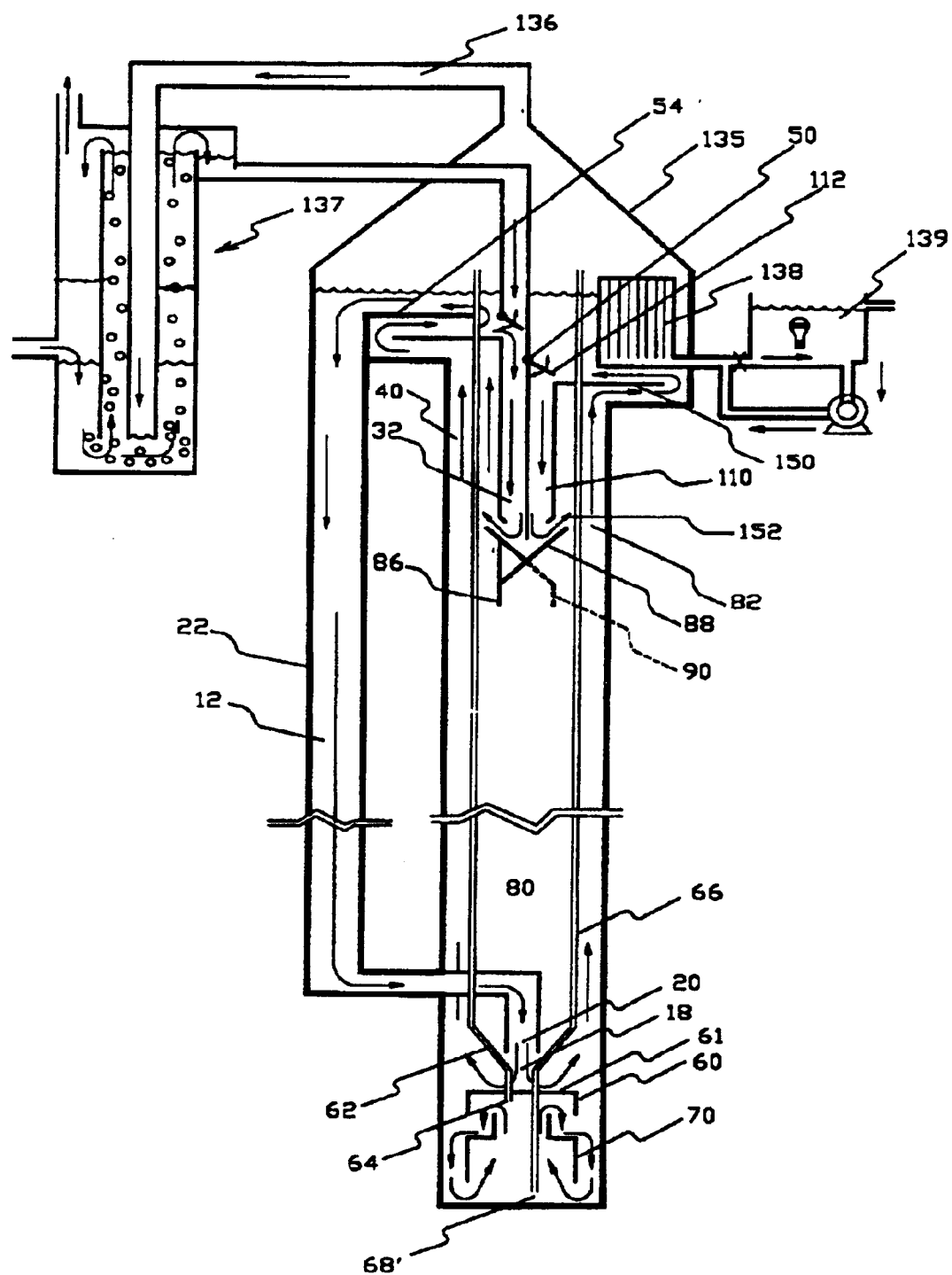
FIG. 5 is a diagrammatic vertical section through one embodiment of a bioreactor according to the invention for use in waste water treatment. This embodiment features a pressurized head tank, an off gas collector means, said off gas driving an air lift influent pump required to overcome said head tank pressure, a membrane filtration cartridge operating under pressure to separate biomass from liquid and a clean water ultraviolet (UV) disinfecting chamber also serving as back wash storage for membrane backwashing.
Figure 6:
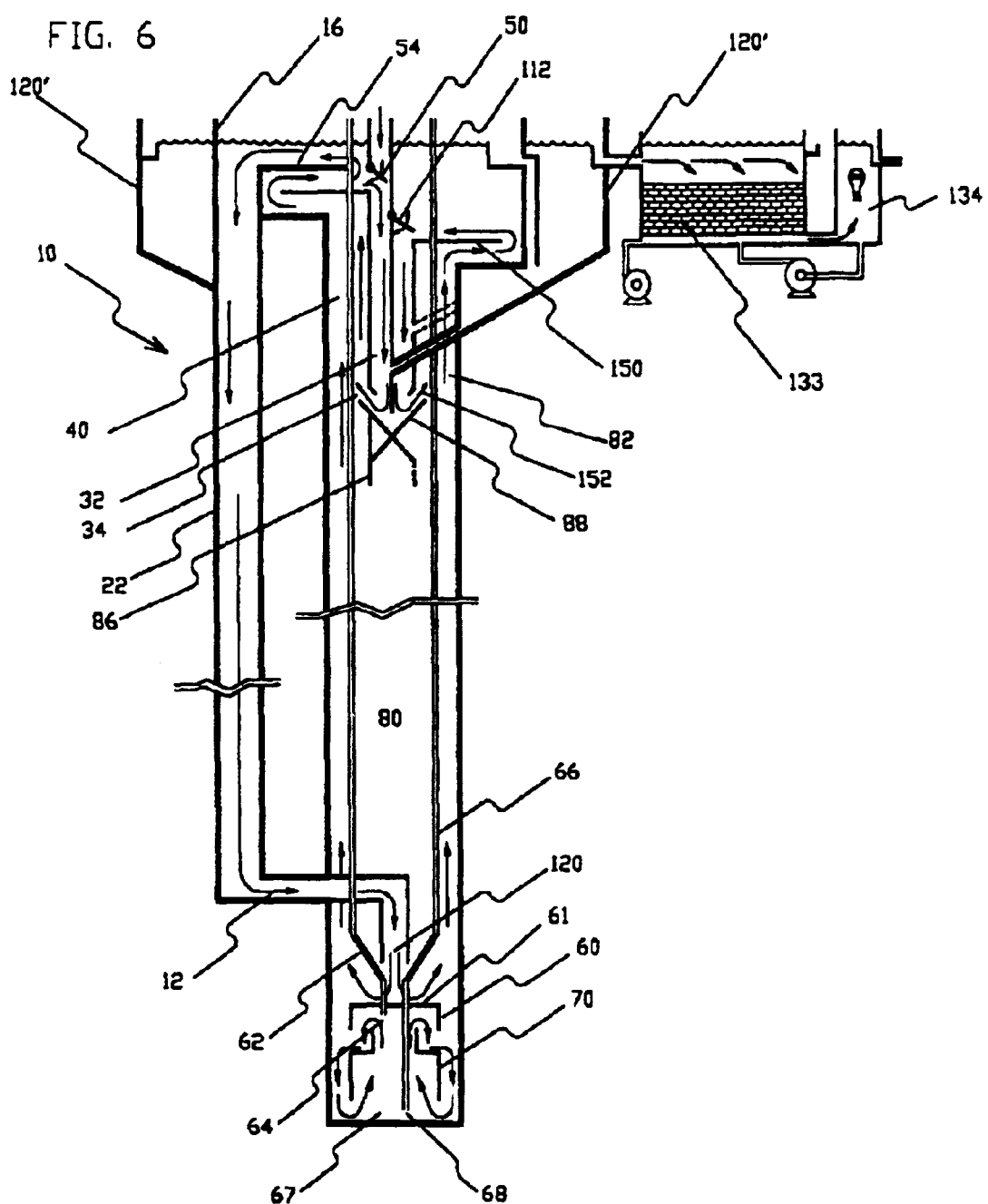
FIG. 6 is a diagrammatic vertical section through one embodiment of a bioreactor according to the invention for use in waste water treatment. This embodiment features an integrated clarifier followed by an aerated polishing biofilter followed by an ultra violet light disinfection chamber and filter back wash tank.

Alternate embodiments of the bioreactor 10 illustrated in FIG. 4 feature moving bed media 130 circulating in zone 2 and, additionally or alternatively, fixed media 132 suspended in the head tank 15 of zone 2. Another embodiment, as illustrated in FIG. 5, incorporates a pressurized head tank 135, and an optional off gas collector 136 (see, e.g., U.S. Pat. No. 4,272,379 to Pollock, incorporated herein by reference), for example with off gas driving an air lift influent pump 137 required to overcome the head tank pressure, as well as an optional membrane filtration cartridge 138 (see, e.g., George Heiner et al, "Membrane Bioreactors" Pollution Engineering December 1999, incorporated herein by reference) operating under pressure to separate biomass from liquid and a clean water, ultraviolet (UV) disinfecting chamber 139 also serving as back wash storage for membrane backwashing. Still other embodiments, as shown in FIG. 6, feature an integrated clarifier 120' fluidly connected to an aerated polishing biofilter 133 and an ultra violet light disinfection chamber 134 and filter back wash tank.

Typically, for long vertical shaft bio-reactors, the optimum biological air supply rate required for bio-oxidation process creates excessive "voidage" at the top of the reactor, comparable in the present case to the superior upflow channels exemplified by the zone 1 upflow channel 40 and zone 2 upflow channel 82. Excessive voidage produces undesirable slugging (water hammer), which can cause reactor damage attributed to vibration. The occurrence of slugging air voidage also signifies poor oxygen transfer characteristics within the circulating fluids. The invention addresses these problems in a number of ways, including by providing novel means for regulating circulation velocities and modulating gas content in selected parts or channels of the reactor.

Since oxygen transfer rate and oxygen utilization rates are relatively slower than upward hydraulic velocities in the reactor 10, increasing velocity only reduces the operating efficiency of the reactor. Increased flow decreases bubble contact time and slows oxygen transfer, thus more aeration is required to optimize the process. Similarly, reducing aeration reduces reactor capacity. One proposed method for resolving air voidage and related problems is presented in U.S. patent application Ser. No. 09/570,162, filed May 11, 2000 (incorporated herein by reference) describing the "Ver-Treat II" bioreactor. In this disclosure, flow velocity is beneficially reduced by incorporation of an orifice plate in the lower section of the riser channel. However, this solution does not substantially resolve the problem of slugging, and the orifice plate creates additional problems including risk of fouling and flow aberrations particularly in small municipal plants.

The bioreactor 10 of the present invention resolves these problems in part by incorporating a novel relative configuration of zone 1 and zone 2. Unlike the previously described "VerTreat I" bioreactor (see, e.g., U.S. Pat. No. 5,650,070, issued Jul. 22, 1997, incorporated herein by reference), where zone 2 is below zone 1 and therefore no voidage control in zone 2 is possible, the present invention can control flow and gas content in each zone, independently. Conventional prior art "Deep Shaft" reactors start slugging at a upflow velocity of about 2 feet per second. The above-noted VerTreat II reactors with orifice plates can operate down to about one and a quarter feet per second. Within the present bioreactor, this value can be dampened to as little as one quarter to one half feet per second in the lower part of the riser channel. At lower riser velocities, some heavier solid particles will settle into the sump 67. These solids are conveniently extracted, along with surplus biomass (e.g., circulating within the shear header 70 and surrounding mix zone 18) when desired, by purging of the dual-purpose aeration/solids extraction line 66.

The invention provides substantially more efficient new features and methods for slowing velocity over prior art methods, which includes the ability to dilute the air lift stream in one or more superior upflow channel(s) of the reactor with bubble free fluid, as described above. The advantage of these features and methods over the VerTreat II technology includes the elimination of potential plugging of the orifice plate in the lower and inaccessible section of the riser channel, which is particularly problematic in smaller diameter reactors.

In long vertical air lift reactors such as the bioreactor 10 of the invention, where fluid/gas mixtures are caused to circulate in vertical channels, the volume of gas in a defined volume of liquid changes with the pressure (gas laws). Consequently at the bottom of the reactor, the volume of gas in liquid (voidage) is small, whereas at the top of the reactor the same expanded gas volume to liquid volume ratio is many times larger. Since 34 feet of water is equivalent to about one atmosphere of pressure, it can be readily calculated that 1 cubic foot of air on the surface (1 scf) becomes 0.5 cubic feet at 34 feet depth and 0.33 cubic feet at 68 feet and 0.25 cu. ft. at 102 feet. Therefore integrating the area under the volume vs. depth curve shows 78% of the gas volume voidage occurs in the top 102 feet of the reactor.

Many studies on air-lift pumps and other bubble/water columns show that slugging in water occurs at 11–14% voidage. Slugging is undesirable because the bubbles coalesce into large air pockets which set up vibrations in the reactor, and most importantly, large bubbles have very poor oxygen transfer characteristics. Proposed controls of voidage to ameliorate these effects have been attempted in at least two different ways. One proposed control is to increase the reactor cross section sufficiently to allow disengaging the gas from the gas/liquid mixture. Alternatively, efforts have been undertaken to maintain residual pressure on the gas/liquid mixture at the top of the reactor. Each of these proposed controls have attendant drawbacks making them undesirable for use within the bioreactor of the present invention. For example, head tank designs of some air-lift reactors are provided where liquid depths of ½ atmosphere (17 feet) are used. This reduces the maximum voidage by 17%, but head tank depths much deeper than 17 feet are difficult to construct. In addition, tall head tanks above ground require pumping influent against a significant hydraulic head, wasting substantial energy.

The invention provides novel features and method for controlling voidage and ameliorating the adverse effects of slugging. Briefly, these features and methods reduce the quantity of bubbles per unit of fluid in one or more selected channels or chambers of the reactor 10, either by adding more fluid or reducing the gas. In more detailed aspects, liquid flow in one or more superior upflow channels of the reactor is increased by recycling liquor from an upper segment (e.g., 60–90') of the reactor, through a degas step, and back down to a lower, recycling influx point near the bottom of the upper segment (e.g., 60–90 feet below the surface). It is generally considered that total gas flow (air flow) is determined by biological optimization requirements, however this total gas flow can also be proportioned into selected, superior upflow channels in the upper part of the reactor using novel flow control mechanisms described herein.

Because approximately 75–80% of the voidage occurs in the top 60–90 ft. of the reactor, the recycle channels (exemplified by the influent channel 32 which optionally nested receives zone 1 recycle input from zone 1 recycle port 140, and the zone 2 recycle channel 110), are only about 25–35% of the total depth of a typical bioreactor and occupy only a small fraction of the reactor cross section area and volume. In practice, zone 1 and zone 2 of the reactor comprise approximately equal fluid volume, but in the case of BNR removal zone 2 is expanded in volume for nitrification by increasing the diameter of the zone 2 head tank 15. The voidage in the zone 2 recycle channel can be readily controlled under a wide range of operating conditions by designing for sufficient, adjustable recycle flow of degassed liquor from the zone 2 head tank 15 as regulated by the zone 2 recycle regulator 112. The bubble volume in the zone 1 upflow channel 40 can therefore be diluted by degassed liquor to the extent limited by the acceptable range of minimum and maximum values for influent flow, which is somewhat limited. To resolve this limitation, a regulated amount of liquor may be diverted through the zone 1 recycle port by adjustment of the zone 1 recycle flow regulator 50 (effectuated by operation of the system control unit 51). Controlling flow from the head tank in this coordinated manner is necessary to maintain gravity feed of the effluent.

The instant invention therefore provides a number of separate and optionally cooperative mechanisms and methods to alleviate the problems of slugging at low bioreactor 10 flow velocities. In another aspect, this problem is alleviated by providing a choice of adjustable diverter or baffle devices, exemplified by the fixed or adjustable diverter mechanism 84. The configuration (including size, shape, location and orientation) of this exemplary diverter plate can be fixed at the time of construction and installation of the reactor. Alternatively, these and other flow diverter parameters can be selectably altered, for example by employing a manual or motorized diverter plate adjustment mechanism optionally integrated for functional control (e.g., to control positional and orientation parameters) by the system controller 51. Operation of the flow diverter serves to direct a greater or lesser fraction of air bubbles entrained in the upflow from the primary reactor channel 80 into one or more selected superior channels, for example to divert a greater fraction of the fluid-bubble mixture toward the zone 2 upflow channel 82, allowing a lesser to pass upward into the zone 1 upflow channel 40.

Once the desired fraction of bubbles have been thus diverted into the zone 2 upflow channel 82, the voidage in this channel can be easily corrected by changing the amount of zone 2 recycle flow through adjustment of the zone 2 recycle flow regulator 112. The circulatory loop (following arrows between zone 2 upflow channel 82, across zone 2 degas plate 150, through zone 2 recycle regulator 112, down zone 2 recycle channel 110, and through zone 2 shielded recirculation port 152), together with a surface basin or zone 2 head tank 15 at the top, comprise zone 2 and represent the polishing process and optional nitrification features of the bioreacter which are driven by waste gas from zone 1. The configuration of the diverter which segregates flow into the superior upflow channels prevents liquor transfer from zone 2 into zone 1, since both liquid and air flow in the zone 2 upflow channel 82 is unidirectionally upward. In this regard, as noted above, zone 2 circulation characteristics are ideal for the application of fixed media 132 (FIG. 4) and, alternatively or cooperatively, membrane separation components (FIG. 5). Moving bed media 130 (FIG. 4) can also be used, since zone 2 circulates completely separately from zone 1, to enhance nitrification within alternative process modes of the reactor.

Hydraulically, any influent flow into zone 1 of the bioreactor 10 (and any required external recycle streams from the clarifier 120 or zone 2 head tank 15) that enter zone 1 must leave zone 1 by entering the bottom of zone 2. Since zone 1 is a closed loop, namely zone 1 upflow channel 40, zone 1 head tank 16, downcomer 12 and primary reactor channel 80, the number of recycles in this loop and the liquid velocity depends directly on the volume of air bubbles diverted by diverter plate 84 into zone 1 upflow channel 40. For example, in a typical municipal effluent of 200 mg/L of BOD, the number of internal recycles is approximately the BOD in mg/L divided by the $O_2$ potential in the reactor, divided by the oxygen transfer efficiency. In a 250 ft. deep reactor, oxygen is injected at about 7.3 atmospheres of pressure. Solubility of $O_2$ in water at 1 atmosphere and 20° C. is about 8 mg/L. This means the dissolved oxygen potential at 7.3 atmospheres is 7.3×8=59 mg/L or about 40 mg/L at an oxygen transfer efficiency of 70%. Therefore, the minimum number of recycles is 200 divided by 59×0.70= about 5. In practice 6 or 7 recycles might be used as a safety factor. A hydraulic loss calculation will determine the fraction of air required for 6 or 7 internal recycles; e.g., 30% of the air that is applied at the bottom of zone 1. As the organic load to the plant increases or decreases, the air rate is adjusted accordingly, causing the number of internal recycles to increase or decrease to satisfy the BOD requirement. However, 30% of the air applied remains consistent, constant as determined by diverter plate 84 placement. Field trimming is achieved, for example, by adjusting regulator valve 50, which changes recycle flow within the air lift section at zone 1 upflow channel 40, thus reducing or increasing its air lift capability.

Similarly, any flow from zone 1 that enters zone 2 must leave as effluent from zone 2. Since the lower portion of zone 2 comprising upflow channel 82 and adjacent downflow channel 110 typically has no internal recycle connection with zone 1, any air diverted from zone 1 into zone 2 will simply cause circulation in the superior channel(s) of zone 2 with no change in the circulation rate of zone 1 (change in air rate in zone 1 does, however, affect the circulation rate in zone 2, but not vice versa).

Therefore, within certain aspects of the invention, diverting for example 70% of the air originating at the bottom of zone 1 into zone 2 only affects the circulation in zone 2 which can be easily controlled by the zone 2 recycle regulator 112. Hydraulically, influent flow into zone 1 upflow into zone 2 and effluent from zone 2 within the reactor 10 are equal in quantity, i.e., influent flow entering the reactor in zone 1 exits through zone 2. With reference to prior art vertical bioreactors treating municipal waste, the internal recycle flow is about ten to twelve times the influent flow, or effluent flow. The present process, which features novel air lift controls as described above, can reduce this flow by about a 2–3 fold reduction, often a 5–6 fold or even greater reduction.

Figure 7:
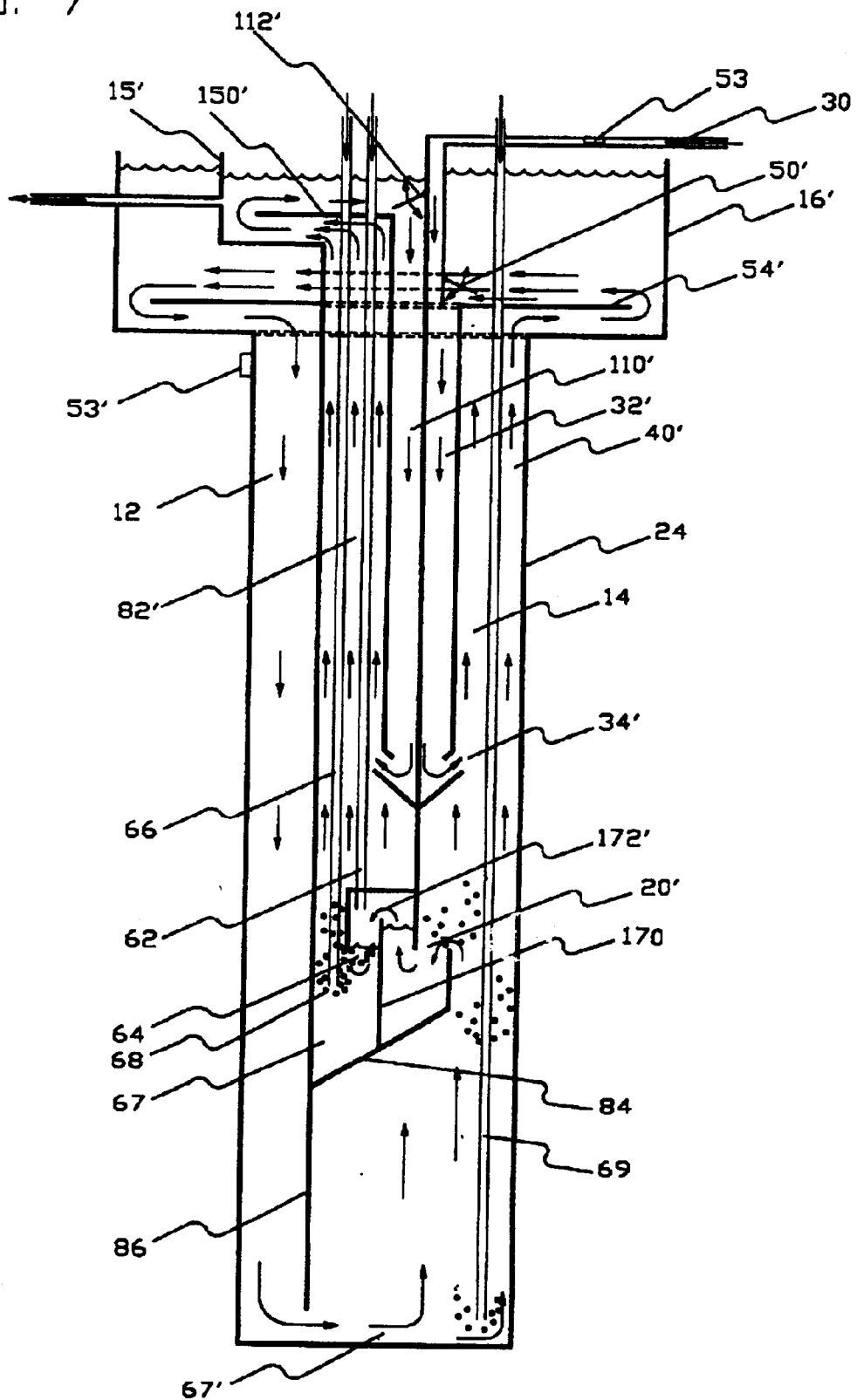
FIG. 7 is a diagrammatic vertical section through one embodiment of a bioreactor according to the invention for use in treatment of biosolids. This embodiment features an inter zonal self batching air lock at the bottom of the bioreactor. In this case, zone 2 head tank is concentric and internal to zone 1 head tank.

By adjusting the configuration of the diverter (generally referring to any diverter device for segregating flow from the primary reactor channel 80 into a plurality of superior upflow channels), the selected bubble fraction only (not typically the same as the liquid flow fraction) in the primary reactor channel can be segregated among any desired number of channels (typically 2, 4 or 6, depending on reactor size and purpose) in any ratio selected to achieve optimum operation of zone 1 and zone 2 (note that each superior channel shown in FIG. 8 has a companion channel opposite it, which is a typical layout for larger reactors using two or more clarifiers. Smaller reactors have only 4 channels and a center downcomer, as illustrated in FIG. 7). For example, typical flow values in the zone 1 upflow channel 40 may be selected to be 6–8 times (alternatively, 2–3 times with BNR) the flow entering zone 2 at the top of zone 1 at the level of the diverter plate 84 (immediately below the zone 2 upflow channel 82), but only require 20–30% the amount of air to produce a non slugging air lift effect. Alternatively, when not using BNR, the flow into the zone 2 upflow channel may be selected to be about one sixth the flow in the zone 1 upflow channel, but conversely receive about 75–85% of the air. Air flow settings into the zone 2 upflow channel can thus be set over a broad range of flow settings, for example 10–15%, 20–30%, 30–50%, 50–75%, 75–90% or greater.

After diluting the zone 2 upflow, for example using 8 to 10 times the recycle flow from the zone 2 head tank 15 via the zone 2 recycle regulator 112, the air lift effect in the zone 2 upflow channel can be readily controlled. This control depends on the novel mechanisms and methods set forth above for segregating flow in an aerated and flowing vertical column, providing for selectable channeling of flow in different proportions into two or more other superior vertical columns, while the air bubbles may be split in a completely different ratio among these vertical columns. This novel ability to control air lift allows a better biological match between oxygen supply (dependent on the time available at pressure to dissolve oxygen, which is in turn a function of flow velocity) and oxygen utilization which is a function of respiration rate, (dependent on dissolved oxygen-not primarily upon the amount of bubbles present).

Figure 12:
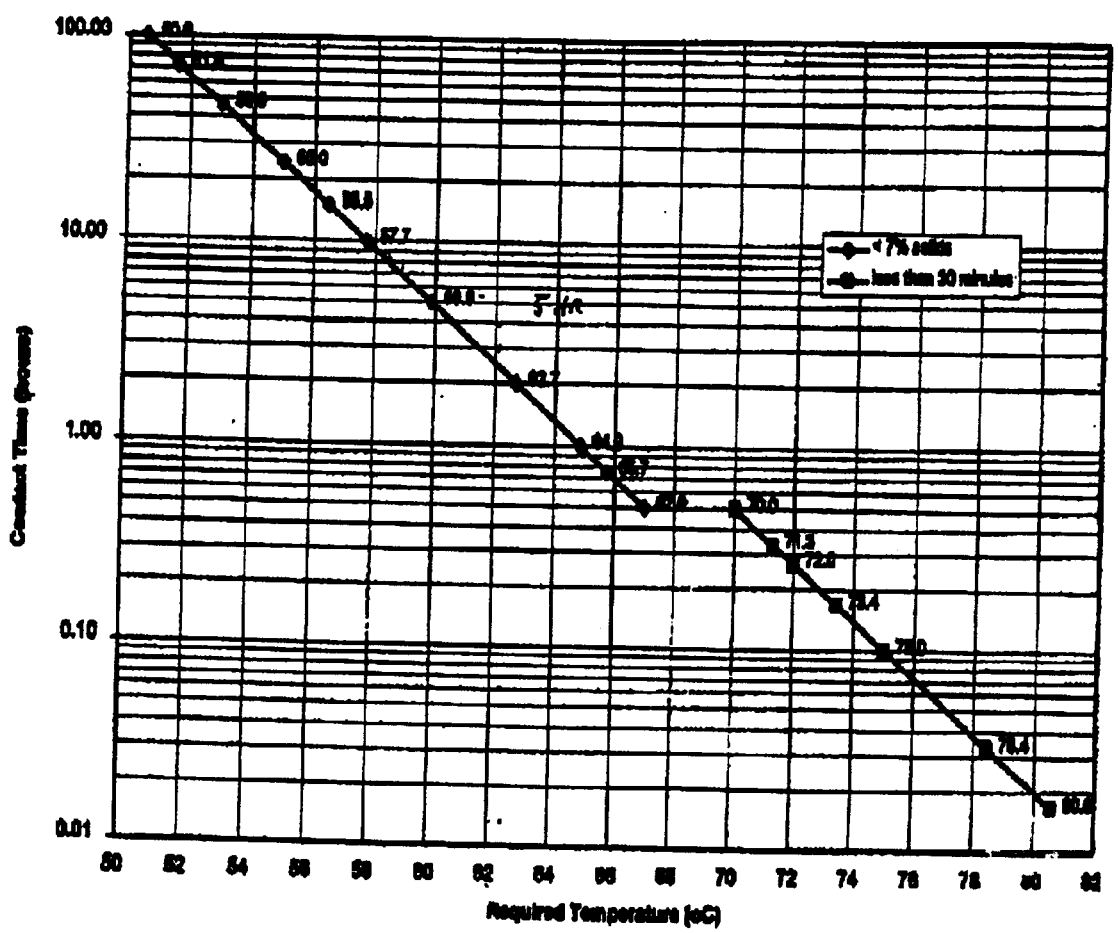
FIG. 12 provides a graphical representation of the EPA time and temperature requirements for class A bio-solids.

Within yet another aspect of the invention, novel features and methods are provided for addressing the challenges involved in the disposal of by-product sludge and/or surplus bio-solids from the bioreactor 10 treatment processes. Recognizing the nutrient value of these biosolids, the EPA in the US adopted 40 CFR 503 in 1993, which proscribes various process criteria to achieve class A bio-solids for unrestricted use as a soil supplement. Whenever possible, beneficial reuse of bio-solids is encouraged. One set of criteria for Class A bio-solids requires a minimum volatile solids reduction, as well as a Time-Temperature relationship, for example a 38% volatile Solids reduction and a 60° C. temperature for 5 hours qualifies as a Class A product. FIG. 12

Within a modified embodiment of the invention, referring to FIG. 7, the bioreactor 10 is designed to function alternatively as a waste sludge digester and to meet the minimum volatile solids reduction and Time-Temperature relationship criteria for Class A biosolids production. In this regard, the reactor is specially designed and operated with a unique flow and zonal separation regime that provides for production of Class A biosolids in as little as 5–6 days, often in 3–4 days or less, using thermophilic bacteria operating at 58–65° C. but typically 58°–62° C. and often 60° C. The 38% volatile solids reduction is a measure of stability of the biomass or vector attraction reduction (VAR), while the elevated temperatures pasteurize the product to control E-coli and virtually eliminate salmonellae. Consuming 38% of the volatile matter minimizes odor potential and provides enough food energy for Thermophilic bacteria to raise the temperature of the reactor to over 60° C., without applying exogenous heat.

Published data demonstrate two areas of concern for existing vertical shaft bioreactors that seek to produce class A biosolids (see, e.g., Report on VerTad operations King County Wash., project 30900 May 20001, incorporated herein by reference.) First, small vertical bioreactors (e.g., "VerTad reactors", as described for example in U.S. patent application Ser. No. 09/570,162, filed May 11, 2000 (incorporated herein by reference), feature a relative disposition of zone 2 (polishing zone) below zone 1. These reactors have a comparatively large surface area to volume ratio, and excessive heat is lost to the surrounding geology. Small reactors therefore require supplemental heat to support class A biosolids production, which is available at additional cost by recapturing the waste heat from the compressor or from the hot effluent stream.

A second area of concern for previous vertical bioreactors directed to high quality biosolids production is that there is insufficient liquid to liquid separation between zones 1 and 2. Published data of tracer studies in VerTad reactors show that the zone 2 (polishing zone) behaves as a plug flow reactor, with a critical feature of localized back-mixing. Over a period of about 8 hours, zone 2 begins to mix with zone 1 and the whole system (zone 1 and zone 2) is mixed in 16–20 hrs. Accordingly, some solid particles, potentially containing salmonellae or other prohibited contaminants, can settle from zone 1 into zone 2 without being exposed to the required retention time at pasteurizing temperature to meet class A biosolids requirements.

The improved bioreactor/digester 10' of the present invention is configured in a distinct manner with zone 1 surrounding zone 2 (FIG. 7), such that for any given volume of reactor the surface to volume ratio is smaller than in previously described reactors directed to quality biosolids production, whereby the heat lost to the surrounding geology is much less. The improved bioreactor/digester provides enhanced liquid to liquid separation at a transfer point between zone 1 and zone 2. The transfer point is delineated by an air lock mechanism 172 (e.g., a diaphragm-less air operated valve) typically including an air lock baffle 170 as depicted in FIG. 7. The baffle extends upward into an air pocket formed by the introduction of clean, pressurized air from a dedicated air line 62 with air delivery port 64 or aeration/solids extraction line with corresponding port 68 located near sump 67. Zone 1 is aerated through port 69

Within this aspect of the invention, it is considered critical that when the apparatus is being used as an aerobic thermophilic sludge digester, bubbles from zone 1 must not enter zone 2 because of the risk of re-inoculating the pasteurized product in zone 2. To prevent this from occurring, pressure in the air lock is maintained by fresh clean compressed air, and there is no liquid flow or contact between zone 1 and zone 2 or transmission of contaminated air from zone 1 to zone 2. The air lock is designed to prevent inter-zonal mixing of liquid between batches, ensuring that zone 1 does not re-inoculate the pasteurized biomass in zone 2 with pathogenic bacteria during batch processing. As an example, one batch of sludge may be processed every 5–8 hours, thus ensuring that the critical time temperature of 60° C. for five hours is always met within each batch.

In operation of this embodiment of the invention, waste biomass is fed continuously or intermittently into the reactor/digester 10', e.g., into the zone 1 head tank 16'. As the head tank level in zone 1 rises above that of the zone 2 head tank 15' level, a pressure differential develops across the center baffle 170 in the air lock. Eventually the zone 1 liquid level in the air lock exceeds the baffle height and fluid transfers from zone 1 to zone 2. Line 64 air supply is placed slightly below the liquid level of zone 2 within the airlock, whereby at the first onset of flow between zone 1 and zone 2, the bubbles are swept away into zone 2 and the air lock collapses. Flow stops when the head tank levels are again equal and the airlock re-establishes itself. A batch can also be initiated by draining the zone 2 head tank 15'. FIG. 7 shows zone 2 head tank being drained and the air lock approaching batch transfer. The size of the batch is the change in head tank level multiplied by the surface area of the tank. Therefore the baffle 170 need only penetrate into the air lock 172 by a foot or two because 1–2 ft. of liquid level change in the head tank would typically represent a full batch. The additional hydraulic considerations in this aspect of the invention are similar to those set forth for the preceding embodiments.

When the bioreactor 10' functions as a waste sludge digester (see, e.g., FIG. 7), thickened waste sludge, generally 4–5% solids by weight, is fed into the reactor, for example through influent conduit 30. The feed can be continuous, or batch wise, depending on the operation of the waste water treatment system generating the sludge. The raw sludge typically descends into the reactor through influent channel 32, and is met with a zone 1 upflow stream 40' containing an elevated percentage of air bubbles (e.g., 10–15%). The combined streams are less dense than the influent stream 32' or flow in the downcomer channel 12' and as a result, downward circulation is induced in the downcomer channel and in the influent channel. In this way influent is drawn into the reactor and circulation and aeration occur in zone 1. In FIG. 7, it is important to realize that the head tank circulation from zone 1 upflow channel 40' to channel downcomer channel 12 is behind the zone 2 head tank 15' as indicated by the broken arrows.

Figure 10:
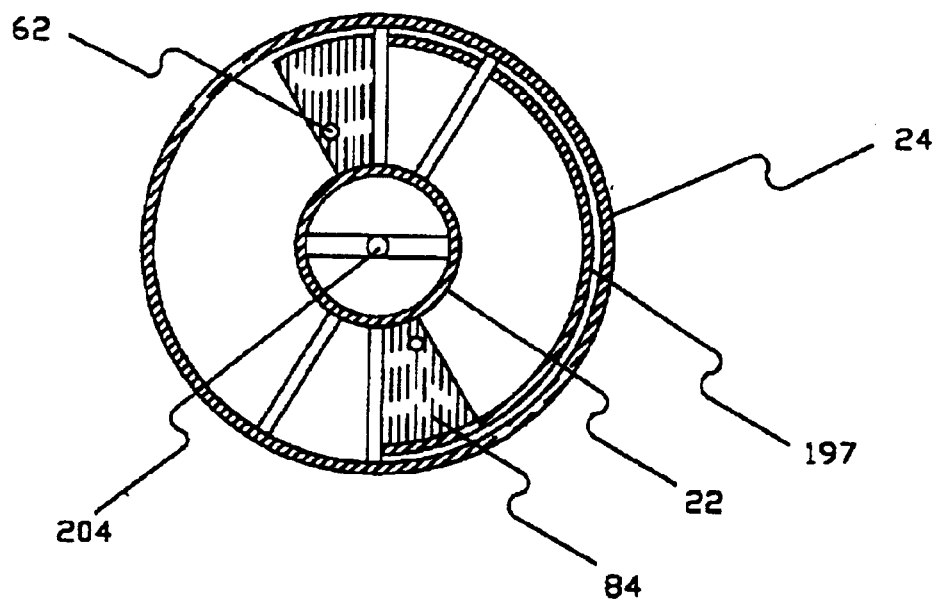
FIG. 10 is a diagrammatic end view of the reactor internal section showing the downcomer and radial baffles. The element in the center represents the expansion tool in its relaxed position. The downcomer is also in its relaxed position. The removable expansion tool which is operated by actuation means from the ground level, is inserted in its relaxed position during fabrication.
Figure 11:
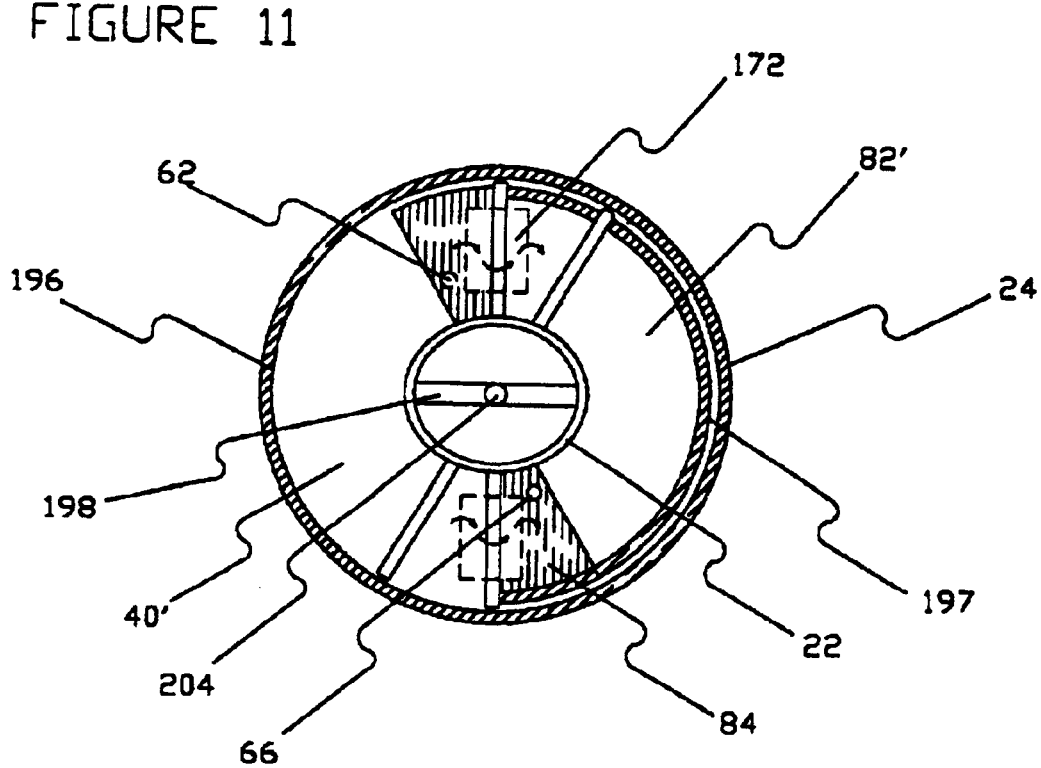
FIG. 11 is a diagrammatic end view of the reactor internal section showing the downcomer forced out of round by the expansion tool. The radial baffles connected to the downcomer are shown relaxed from the casing wall, allowing easy insertion.

In addition to zone 1 and zone 2 being hydraulically separated by a diaphragm-less air valve (air lock 172), the lower portion of each zone functions as a pseudo plug flow zone while the top portion of each zone is circulated in the superior channels and is well mixed. As a result each of zone 1 and 2 is further divided into two additional smaller zones to double guard against reinocculation of the finished product with the raw influent. When the present invention is used as a sludge digester, baffle 86 extends to about 70–90% of the reactor depth and baffle 84 completely seals off the bottom of zone 2 from zone 1. For certainty that no cross contamination can occur, zone 2 may be further sealed with second outer wall 197 in close proximity to the outer casing 196 as shown in FIG. 10 and FIG. 11. The air locks 170 are shown penetrating the septa wall between zone1 and zone 2 at a location above baffel 84, but below ports 34 and 152. Zone 1 has an aerated volume below zone 2 of at least one batch volume and preferably two.

The reactor/digester 10' of FIG. 7 is thus very similar in its operation to the waste water treatment reactor illustrated in FIG. 1, but differs in four principal aspects:

1. The zone 1 surrounds zone 2;
2. Zone 2 extends downward about 70–90% of the depth of the reactor within zone 1;
3. Each zone has its own aeration means;
4. There is liquid to liquid separation between zone 1 and zone 2 through use of the airlock 172.
5. Each of zone one and zone two is further divided into an upper circulating zone and a lower pseudo plug flow zone.

Once sludge enters the reactor/digester 10' it has a mean residence time of approximately 2 to 3 days in zone 1, and 2 to 3 days in zone 2. The EPA criteria for the production of class A bio-solids dictates the time between batches, which varies with temperature—as an example the minimum residence time for a batch at 60° C. is 5 hours, or about 4.8 batches per day. Therefore, zone 1 and zone 2 theoretically contain between 9.6 and 14.4 batches each. In practice, however, each batch would be about 8 hours, and therefore zone 1 and zone 2 would contain between 6 to 9 batches each. The overall residence time is determined by the biodegradability of the sludge. For class A bio-solids, the process must achieve a minimum of 38% volatile solids reduction which typically takes 3.5–5 days. The batching time is determined by the temperature (see, e.g., FIG. 12). The preferred operating temperatures of 58° C.–62° C. require approximately 8–4 hours.

As noted above, the air line 62 can be operated to maintain the air pressure in the air lock 172 of the reactor/digester 10' to control batching. Stopping the air flow in line 62 will also trigger a batch discharge after the appropriate processing time has elapsed. A batch can also be triggered by lowering the liquid level in the zone 2 head tank 15'. Once the batch in zone 2 is discharged, the head tank level in zone 1 is automatically lowered an equal amount by the action of the automatic batching valve located between the bottoms of zone 1 and 2, and the cycle repeats. When a batch is processed through the reactor, it is reduced in solids content from approximately 4–5% down to about 2–3%. This product (class A biosolids) may then be de-watered.

Published research by The University of Washington (Guild et al., Proceedings of WEF Conference, Atlanta Ga., 2001, incorporated herein by reference) indicates that when thermophic aerobic digested sludge from a vertical shaft reactor having certain features in common with the reactor of the present invention was fed to a mesophilic anaerobic digester, the retention time in the anaerobic digester was reduced, the overall volatile solids reduction was better, the dewaterability was better and required less polymer. The thermophilic aerobic digester is operated with a about a 2 day retention time and can generate enough heat to comply with Class A biosolids.

It is well documented that during the aerobic thermophilic digestion of biomass, there is minimal nitrification of ammonia at temperatures above 42° C. It is also well documented that in anaerobic digestion of biomass (where there is no air stripping), ammonia and carbon dioxide react to form ammonium bicarbonate. In a vertical aerobic thermophilic digester, it is reasonable to believe that ammonium bicarbonate also forms, due to large amounts of both ammonia and carbon dioxide remaining in solution due to pressure.

The selection of operating temperatures is very important in long, vertical thermophilic aerobic digesters because ammonium bicarbonate decomposes at about 60° C. Ammonium bicarbonate is very important in the efficiency of the solids liquid separation (dewatering) step of the process. For instance, when operating a deep vertical thermophilic aerobic digester at 55° C. to 58° C., the digested sludge samples were very granular before drying the sample but not after drying at about 104° C. On one occasion when the head tank was opened without cooling the reactor (for emergency repair of a float switch), the inside surface, particularly the uninsulated access cover, was coated with tiny white angular crystals much like white sugar or salt. These crystals subsequently disappeared and were not found again at the higher operating temperatures. Another observation that is common, is that when a batch of product is transferred into the soak zone at about 58° C. (where there is negligible biological activity), the temperature increases and holds constant for about 2 hours, then cools at the cool-down rate of the reactor when operating on hot water. The heat of crystallization of 10,000 mg/L of ammonium bicarbonate would account for the apparent heat generated in the soak zone. Empirically, these observations would suggest the formation of ammonium bicarbonate crystals below 60° C. This is contradicted by the fact that ammonium bicarbonate is very soluble in water, but less so in the presence of high levels of other dissolved solids, and perhaps the surface chemistry of the microbiology facilitate the crystallization process. For instance, Struvite (magnesium ammonium phosphate) is readily formed in anerobic digesters of plants using biological phosphorus removal but not in plants using chemical phosphorus removal. Controlling the reactor temperature to below 60° C. may allow ammonium bicarbonate crystals to form which would easily float separate with the sludge.

Table 1 compares the performance of floatation, nutrient fractionation, and dewaterability of thermophical aerobic digested sludge that was taken from a deep vertical thermophilic aerobic digester similar to the present invention. It is known that thermophically digested sludge will dewater better than anaerobically digested biosolids however at much higher polymer dose. Previous studies investigated the cause of the high polymer requirement and found that monovalent ions such as sodium, potassium, and particularly ammonium ions can interfere with the charge-bridging mechanisms in the floc. In conventional thermophilic aerobic digesters the nitrification of ammonia is inhibited over 42° C. and therefore the ammonia produced is in largely in solution, as evidenced by typically high pH. The carbon dioxide produced is substantially stripped out by the large air flows required in these digestors and less carbon dioxide remains in solution to form ammonium bicarbonate. Since the air bubble contact is in the order of seconds, and the rate of solution of ammonia is much faster than that of carbon dioxide, the environment does not favor the formation of ammonium bicarbonate.

TABLE 1

Nutrient Fractionation
CF is Concentration Factor

| Stream | TS % | CF | TN mg/L | CF | NH$_3$ mg/L | CF | ORG-N mg/L | CF | TP mg/L | CF | Cake % | Poly #/T |
|---|---|---|---|---|---|---|---|---|---|---|---|---|
| Digested | 4.8 | | 4780 | | 1163 | | 3095 | | 970 | | | |
|  | | 2.2 | | 2.4 | | 1.6 | | 3.1 | | 2.8 | | |
| Float | 10.7 | | 11347 | | 1860 | | 9487 | | 2750 | | | |
|  | | 7.1 | | | 1.2 | | | 500 | | 24 | | |
| Recycle | Clear | | 1589 | | 1570 | | 19 | | 115 | | | | pH 7.8–8.0
T ° C. Under 60 (59–60.5)
4.80% Digested Vertad Sludge

| Digested | 3.8 | | 1851 | | 802 | | 1049 | | 548 | | 26–30 | 50–70 |
|---|---|---|---|---|---|---|---|---|---|---|---|---|
|  | | 1.5 | | 1.7 | | 1.2 | | 2.1 | | 1.3 | | |
| Float | 5.6 | | 3185 | | 948 | | 2238 | | 704 | | 31–34 | 14 |
|  | | 3.4 | | | 1.8 | | | 9.9 | | 1.6 | | |
| Recycle | Turbid | | 927 | | 702 | | 225 | | 442 | | | | pH 8.5–8.8
T ° C. Over 60 (61.5–63.5)
3.80% Digested Vertad Sludge

It is believed that below 60° C. ammonium bicarbonate forms in a deep vertical bioreactor due to the high level of carbon dioxide and ammonia in contact and under pressure for long periods of time. Above 60° C. ammonium bicarbonate decomposes and the carbon dioxide and ammonia are stripped out with the air stream, very similarly to the conventional thermophilic aerobic processes. When the final product, processed below 60° C., is acidified with sulfuric acid, alum, or ferrous sulphate, etc, ammonium sulfate is formed and $CO_2$ is released, thus floating the sludge. Unexpectedly, the floated product dewaters exceptionally well. In recent reports by Murthy et al. (Mesophilic Aeration of Auto Thermal Thermophilic Aerobically Digested Biosolids to Improve Plant Operations, Water Environment Research 72, 476, 2000; Aerobic Thermophilic Digestion in A Deep Vertical Reactor, Project 30900, Prepared for King County Department of Natural Resources, Mar. 28, 2001, each incorporated herein by reference) the concentration of biopolymer (protiens and polysaccharides) in thermophilically areobic digestion could be minimized by limiting the residence time of the thermophilic digestion. The present invention has ⅓ to ½ the residence times of conventional thermophilic aerobic digesters. The presence of biopolymer and monovalent ions, particularly ammonia, in solution correlates well to an increase of polymer consumption. The formation of ammonium bicarbonate would significantly reduce ammonium ions.

Lowering the pH with acid to about 5.0, causes the biosolids to float to about 10–12% concentration. Lowering the pH to 4.5–4.0 and lower yields a faster float separation but may require adjustment, e.g., to pH 5.5–6.0, which is the pH range of the sludge before digestion. Digestion below 60° C. controls the reactor pH to 7.8–8.0 while digestion over 60° C. results in an operating pH of 8.6–8.8, reflecting the effect of more free ammonia due to the decomposition of the ammonia bicarbonate. Flotation separating is better below 60° C. than above 60° C., in all categories, where the less acid used yields a thicker float blanket and better nutrient fractionation. These biosolids can be further centrifuged to 30–35% solids concentration using a low polymer dose of about 15 pounds polymer per ton dry weight biomass. The acidification process may cause some cell lysis, which will also help dewater the sludge.

These results are substantially better than conventional thermophilic aerobic digestion processes which require 30–50 pounds polymer per ton dry weight biosolids and centrifuge to only 20–25% solids. Acidifying the conventional thermophilic aerobic digester product does not float separate the solids, presumably due to the lack of ammonium bicarbonate.

Examination of the data in Table 1 shows the profound effect on flotation, dewatering, and nutrient fractionation, between operating the reactor under 60° C. and over 60° C. Operation under 60° C. generates less free ammonia and more ammonium bicarbonate, therefore the pH is lower and there is less ammonia in the off-gas. In order to get a common base for a comparison between the two sets of data, a concentration factor is calculated. The concentration factor [CF] is the ratio of the final concentration to the starting concentration.

Looking at the "under 60° C." set of data the float solids were 2.2 times more concentrated compared to the digested sludge solids; the total nitrogen in the float was 2.4 times as concentrated; the ammonia in the float was 1.6 times as concentrated; the organic nitrogen was 3.1 times as concentrated; and the total phosphorus was 2.8 times as concentrated. Except for ammonia the nutrient concentration factor ranged from 2.4 to 3.1 when the solids concentration factor was 2.2.

Looking at the "over 60° C." set of data the float solids were 1.5 times more concentrated compared to the digested sludge solids; the total nitrogen in the float was 1.7 times as concentrated; the ammonia in the float was 1.2 times as concentrated; the organic nitrogen was 2.1 times as concentrated; and the total phosphorus was 1.3 times as concentrated. The nutrient concentration factor, including ammonia, ranged from 1.2 to 2.1 when the solids concentration factor was 1.5.

These data strongly suggest that the nutrient fractionates into the sludge solids in nearly the same ratio as the solids concentration factor (except for ammonia under 60° C. which is expained later). It is expected that the same fractionation will also occur during dewatering of the floated solids.

However, looking at the float solids concentration factor compared to the subnatent or recycle stream, a completely different and surprising discovery emerges.

The "under 60° C." set of data shows the total nitrogen in the float was 7.1 times as concentrated as in the recycle; the ammonia in the float was 1.2 times as concentrated; the organic nitrogen was 500 times as concentrated; and the total phosphorus was 24 times as concentrated. Except for ammonia all the nutrients shifted dramatically from the clear recycle into the sludge solids. In other words, except for ammonia, the other nutrients are substantially removed from the recycle streams thus benefiting the operation of the treatment plant and improving the nutrient value of the bio-solids.

The "over 60° C." set of data shows the total nitrogen in the float was 3.4 times as concentrated than in the recycle; the ammonia in the float was 1.8 times as concentrated; the organic nitrogen was 10 times as concentrated; and the total phosphorus was 1.6 times as concentrated. Except for ammonia and phosphorus, the nutrient shifted significantly, but less dramatically from the turbid recycle into the solids.

A possible explanation of the minimal shift of ammonia into the solids is that the acidification of ammonium bicarbonate results in ammonium sulphate which is very stable but very soluble. The shift in the organic nitrogen to the sludge solids is likely because organic nitrogen is present in the particulate matter of digested sludge and would likely float separate. The ammonium bicarbonate crystals, if any remain after acidification, might also float separate as particulate matter. The shift in phosphorus to the sludge solids by acidification of the sludge can be explained by the formation of insoluble precipitates in the presence of a high concentration of metals occurring naturally in the sludge. This effect is not so pronounced over 60° C., probably because the float separation was poor and the tiny particles formed in the precipitate are difficult to float.

In constructing and installing the improved vertical shaft bioreactor 10 of the invention, twin bioreactors (to satisfy EPA redundancy requirements) will often be placed in cased and grouted steel shafts approximately 36 inches in diameter and 250 feet deep. The exemplary scope and reactor design described here for illustration purposes is suited for a community of about 5000 people requiring a tertiary treatment plant with biological nutrient removal would proceed as follows. Also described here for illustration purposes is a novel, modular bioreactor assembly design, while it will be understood that the use of a modular assembly method is not necessary to practice the invention.

The inner head tank for this exemplary installation is about 8 feet in diameter and approximately 12 feet high. The shop fabricated reactor internals include 6 flanged tube bundles each about 40-ft. long. The bottom 40-ft. length (first length) is made up of the aeration distributor 60, the shear header 70, the airlines 62 and 66, attached to a short length of downcomer 12. The second, third and fourth tube bundles, include 40 ft., modular sections 190 typically including a central downcomer conduit 22 with airlines 62 and 66 attached (see, e.g., FIGS. 9–11). These sections are joined, e.g., bolted, together sequentially at modular section joints 192 to the preceding section as the sections are sequentially lowered into the shaft. The top two sections, 5 and 6, comprise the downcomer air lines and superior channels formed as a unit by using the central downcomer 22 and radial channel partitions 194. After installation, the radial partitions will assume a light press fit in the reactor shell (e.g., against an inner wall 196 of the riser conduit 24.

Figure 9:
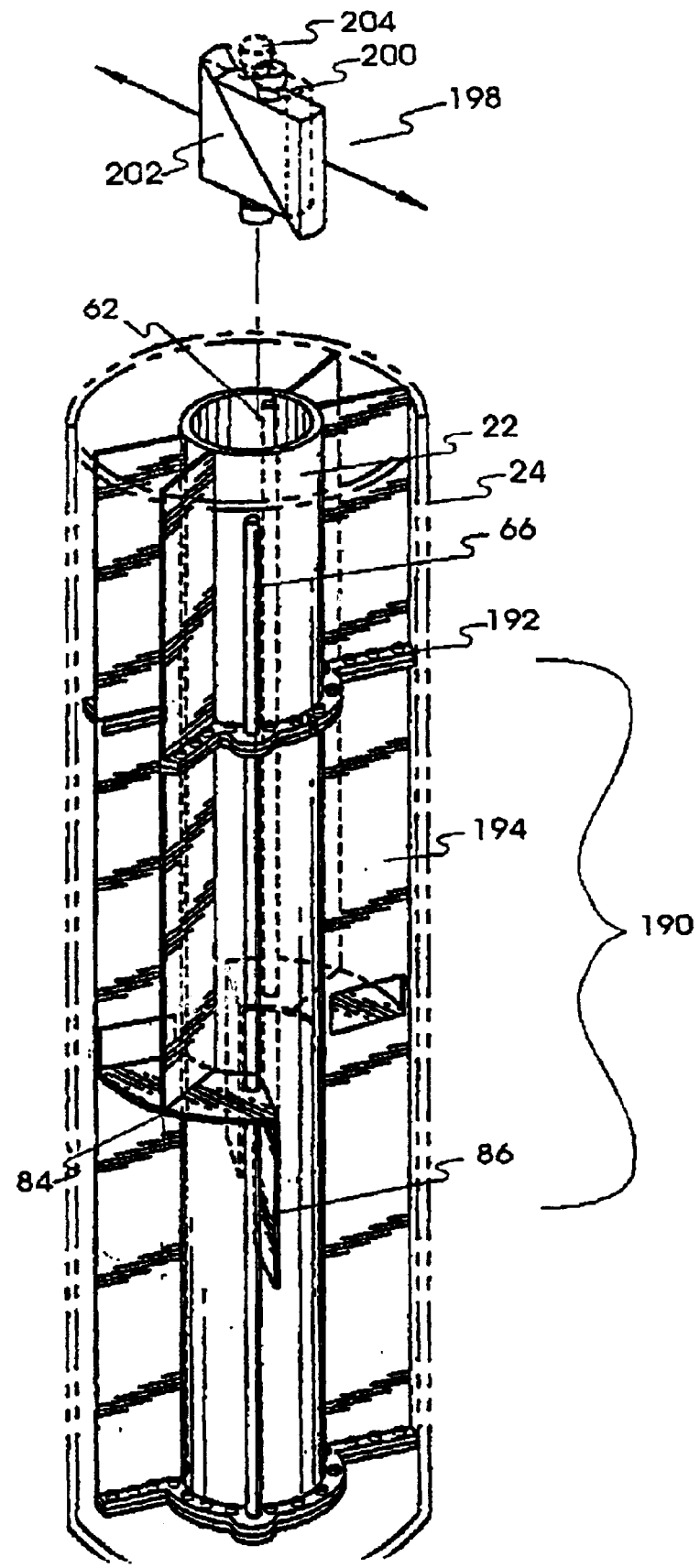
FIG. 9 is an isometric vertical section of a portion of reactor internal channels and downcomer flanged and bolted. This figure shows a downcomer expansion tool which is used during insertion of the assembly into the reactor casing.

To facilitate modular construction of the bioreactor 10, the superior channel-forming radial partitions 194 are relaxed from the inner wall 196 of the reactor during insertion by expanding the diameter of the central (e.g., downcomer 22) conduit in a direction generally perpendicular to the radial partition (see, e.g., FIG. 11). To expand the downcomer conduit in this manner, FIG. 9 depicts a novel conduit expansion device 198, which is provided, for example, in the form of a spreader sized and dimensioned for insertion within the downcomer conduit. The spreader typically has paired, opposed and reciprocating spreader parts 200, 202, which can be manually, reciprocatingly repositioned between relaxed and expanded configurations (e.g., by remotely turning a threaded expansion driver 204 that engages each of the reciprocating spreader parts and causes them to spread in the direction of the outwardly directed arrows in FIG. 9, or to cooperatively relax in the opposite direction). Thus, FIG. 10 provides a diagrammatic end view of the reactor internal section showing the downcomer and radial baffles. The expansion tool 198 in the center of the downcomer conduit 22 is shown in its relaxed position. Accordingly, in this Figure the downcomer is also in its relaxed position. FIG. 11 provides a diagrammatic end view of the reactor internal section showing the downcomer forced out of round by the expansion tool in its expanded configuration, wherein the radial baffles 194 connected to the downcomer are forcibly retracted away from the inner casing wall 196 to allow insertion of the reactor section 190 therein. When the invention is used as a digester, a sealed zone 2 can be provided by adding a second outer wall 197 on half the assembly. Because this second wall is applied to only half the circumference, it does not prevent the spreaders from deforming the center tube thus relaxing the wall pressure of the septa partitions during installation.

After assembly to this stage is complete, the zone 1 head tank 16 is bolted to the top of the last section. The zone 2 head tank 15 is field-erected from pre-fabricated sections. The modular reactor tube bundles can be delivered to a site for installation by a single truck, and the head tanks by a second truck. The clarifier 120 shell can be cast in place using concrete or made from prefabricated steel sections. The clarifier is fitted with a conventional skimmer mechanism. Finally the compressors and other ancillary equipment are connected. Because of the small footprint these small plants can easily be housed in a building.

Figure 13:
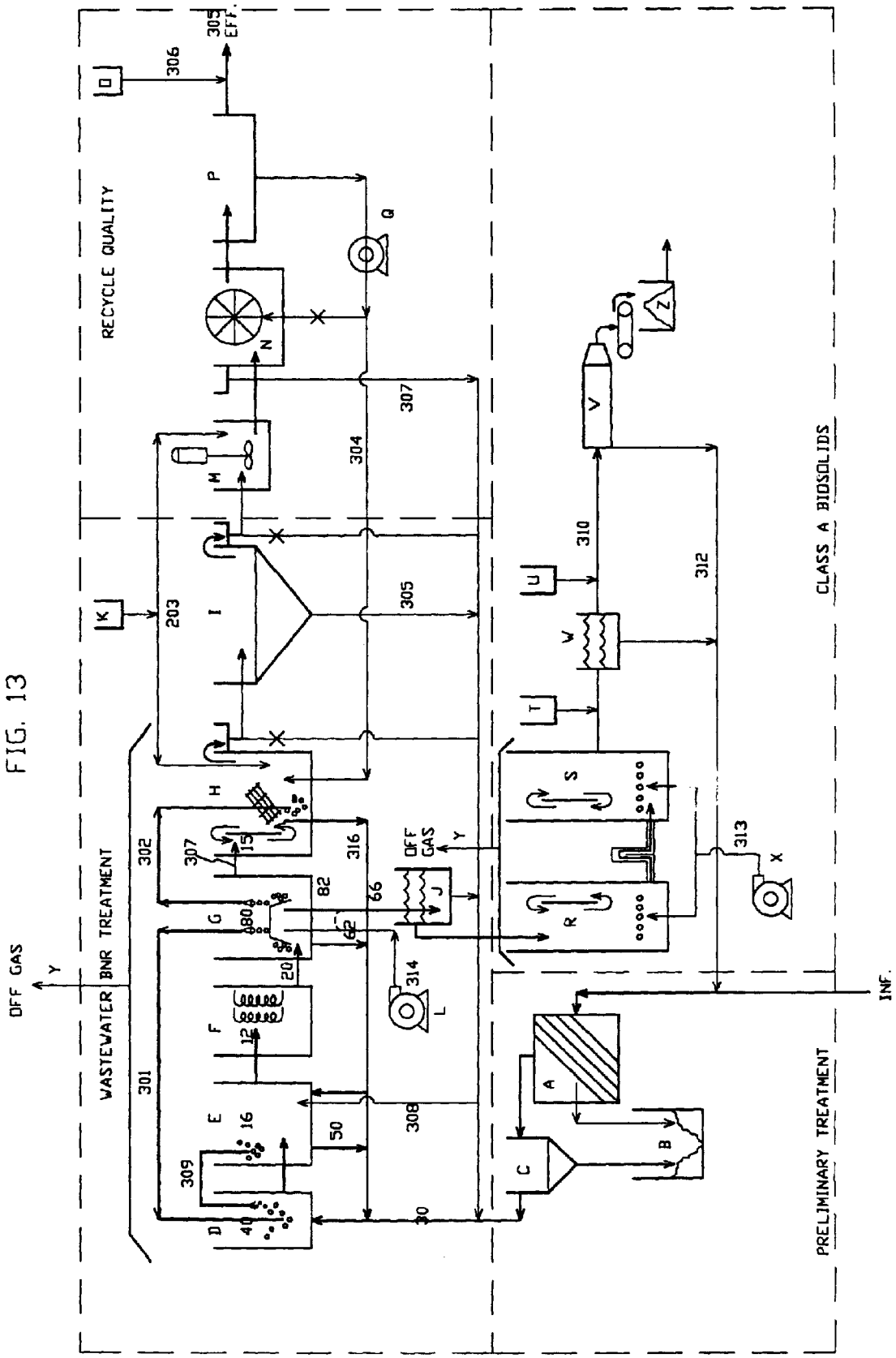
FIG. 13 provides an exemplary block flow diagram of the present invention adapted to produce recycle quality water, Class A bio-solids, and clean odourless off-gas. The following key applies to the FIG. 13.

To further understand the distinct and diverse methods of waste water treatment employing the novel apparatus provided herein, FIG. 13 provides an exemplary block-flow diagram which can be used to identify the various flow patterns and further understand the inter-relationship of unit processes. FIG. 13 is divided into four areas, as delineated by the broken lines. The bottom left area is a conventional preliminary treatment area where the waste water is passed through a fine screen in unit A and is degritted in a hydroclone separator C. The screenings and grit are deposited in a hopper B and sent to landfill.

The upper left area of FIG. 13 is the wastewater treatment and BNR part of the bio-reactor of the invention and represents certain exemplary components thereof. Unit D represents a deoxygenation step or pre-denitrification step and references channel 40 channel 32 and recycle 50 of FIG. 1. The unit D is agitated by the anoxic waste gas originating in lower zone 1 (channel 80 of FIG. 1. The line 301 schematically represents the waste gas transfer from lower zone 1 (channel 80) to upper zone 1 (channel 40) but in this aspect of the invention the lower zone 1 is immediately below upper zone 1 and no transfer line is needed. Unit D receives raw influent (channel 30) from unit C, recycle from head tank E and nitrified recycle from zone 2 (unit H). The purpose of unit D is to remove any useable molecular oxygen, accept nitrates from recycle and ammonia and BOD from the raw influent.

Unit E represents the head tank 16. This unit receives anoxic gas (309) from unit D which serves to mix the contents of head tank 16. Unit E also accepts raw waste water containing about 25 mg/L of ammonia and 1.75 volumes of nitrated recycle containing no ammonia or appreciable BOD. After mixing, the nitrate in the 1.75 volumes of nitrated recycle are converted to nitrogen gas and the influent concentrations are thus diluted by, e.g., 1 Q×25 mg/L ammonia+1.75×nil ammonia/2.75 Q=25/2.75=9 mg/L ammonia and similarly 200/2.75=72 mg/L BOD. The denitrification process liberates, e.g., about 2.6 mg oxygen/mg of nitrate denitrified and some of the alkalinity is recovered. These quantities are exemplary and beneficial to the process. Denitrification is quite a fast reaction and is accomplished by the microbes naturally occurring in the waste water.

Unit F receives, e.g., about 2.75 volumes of denitrified wastewater containing approximately 9 mg/L ammonia and 72 mg/L BOD. Since there is no molecular oxygen or bound oxygen, the biomass will become anaerobic and start using some of the proteins in the raw sewage to make amino acids. The poly P microbes in the system will give up their phosphorus and load up on VFA's. There is some evidence that VFA's can be produced in anaerobic sewer lines where anaerobic slime is allowed to accumulate on the pipe wall. A rope like open weave tube (131) may be hung from the head tank down inside the clean bore channel 12. There is minimal risk of plugging the channel because unlike other prior reactors there are no airlines or other pipes to become entangled with. It is to be expected that anaerobic biomass will accumulate on the rope and some VFA's will be produced allowing some biological phosphorus to be removed. Monitoring the weight of the rope will give some indication of the amount of biomass present. The flexibility of the rope and the velocity of the water should cause excess biomass to fall off and drop into the chamber 67 sump where it can be removed as waste sludge.

Unit G represents the lower portion of zone 1. This area is highly aerated and is designed to reaerate the anaerobic mixed liquor as quickly as possible. Since the mixed liquor that enters the lower portion of zone 1 is rich in BOD, ammonia and sufficient VFA's, the oxygen demand in the lower portion of zone 1 will be the maximum for any part of the reactor. The BOD removal step requires ammonia of cell synthesis which is 5% of the BOD or about 4 mg/L. There is a feed forward stream of 2.75 Q which is transferred into zone 2 containing about [9 in zone 1–4 consumed in cell synthesis ]=5 mg/L of ammonia. Experience with vertical bio-reactors has shown that some of the ammonia is actually nitrified in the lower zone 1. It is not uncommon to find 2–3 mg/L of nitrate in a bio-reactor designed not to nitrify. In the case of a BNR plant designed to nitrify, some of the nitrifying bacteria will end up in zone 1 because of the 1.75 Q recycle stream from zone 2 to zone 1. Additionally there is 5 Q flow [containing 2 mg/L nitrate] from zone 1 to the deoxygenation Unit D. These flows will be denitrified further removing nitrogen from the system. Conservatively the effluent from zone 1 to zone 2 will contain no more than 5 mg/L BOD, 3 mg/L ammonia, and 2 mg/L nitrate. the 3 mg/L of ammonia will be fully converted to nitrate in zone 2. Therefore the effluent will end up being about <10 mg/L BOD, <10 mg/L TSS and< 5 mg/L total Nitrogen.

Unit H represents head tank 15 and operates under very low loading rates. The feed rate into zone 2 head tank is 2.75 Q containing 3 mg/L ammonia and 10 mg/L BOD. Zone 2 receives its air supply from zone 1 (shown schematically as line 302). Because of the low BOD the biomass production will be low and the biomass produced by nitrification is ⅕–⅓ that of BOD reduction. Because of the slow growth of nitrifying bacteria, they cannot be permitted to be washed out of zone 2 in the 1.75 recycle flow to zone 1. Fortunately these bacteria are attachment microbes and will grow on any fixed or moving bed media. In the present invention moving bed media can advantageously be used, because the lower end of zone 2 is designed not to allow any back-flow into zone 1, and simple screening will prevent the media from escaping at the top. Fixed media may also be employed but fixed media tends to plug up occasionally and requires cleaning or changing. Moving bed media tends to be self-cleaning but does wear out over time.

Unit I is a conventional sedimentation clarifier which separates the bio-solids from the effluent and returns these biosolids [activated sludge, RAS] to unit D or E. In a BNR plant the RAS should never become anoxic because the nitrate in the effluent and RAS will denitrify causing the sludge to start floating in the clarifier. In the present invention there is the potential to provide an effluent from zone 2 with a high DO but a low oxygen demand, thereby preventing anoxic conditions in the clarifier. Very high DO in the effluent is discouraged because there could be some resolubleizing of ammonia and phosphate in the clarifier.

Membrane separation, although expensive, eliminates many of the operational problems of clarifiers in BNR plants. In the present invention membrane separation allows much higher MLSS and a smaller reactor. Membrane separation provides a better quality recycle water than the present standards require.

The upper right of FIG. 13 is the final chemical treatment of tertiary water to meet recycle quality standards. By current law, chemical flocculation, filtration and residual chlorine must be used. Unit M is a flocculating tank with mechanical mixer. Unit N is a rotating cloth disk filter. Unit P is a ultra violet disinfection channel and combined back wash tank. Unit O is a chlornination step where just enough chlorine is added to maintain a residule in the pipe line. Unit Q is a back wash pump which can be used to backwash the cloth filter or the membranes if required.

The lower right of FIG. 13 is the thermophilic aerobic digestion section of the plant. Unit R represents the first aerobic stage (zone 1) of the two step process. Unit S represents the second stage of the digection or zone 2. These two zones are connected through an air lock valve. Unit W represents the acid flotation thickening step. Unit T is an acid feeder. Unit V represents the dewatering step, in this case a centrifuge, with a unit polymer feeder U.

The BNR process above has been examined in detail in FIG. 13 in order to illustrate process advantages that are not reported in previous bioreactor designs. Among these novel process advantages are that screened and degritted influent is fed into deoxygenating channel 40 and is mixed with denitrified liquor from head tank 16. The head tank 16 is agitated with anoxic gas produced in channel 40 and with DO<0.05. Denitrified liquor from head tank 16 descends in channel 12 under anoxic or optionally anaerobic conditions completing the denitrification process or optionally creating VFA's.

In addition, it is notable that downflow in channel 12 enters the bottom of zone 1 in the vicinity of the aeration distributor in an area of vigorous mixing. Channel 80 which is the major portion of zone 1 is highly aerobic, removes the BOD, rapidly oxidizes the VFA's consuming phosphorus and in some cases nitrifies a portion of the ammoma.

Further notable is the fact that rising liquor in channel 80 splits into the deoxygenation area and a portion passes upward into zone 2. Zone 2 substantially degrades the remainder of the BOD and converts the remainder of the ammonia to nitrate.

In additional aspects, waste gas from channel 80 circulates via deoxygenation channels 32 and 40 and also provides the oxygen for bio-oxidation of BOD and ammonia in zone 2.

Also noted, a portion of nitrified liquor can be returned to the denitrification step where the nitrate-N is converted to nitrogen gas while a second portion goes to a clarification step where the biomass is separated from the effluent. The biomass is returned to the denitrification step and the clarified effluent is discharged.

In related embodiments, anoxic gas is used for mixing anoxic liquor. Unit D deoxygenates not only the various liquid streams, but the gas stream passing through the unit. This deoxygenated gas can be used subsequently to mix the contents of the denitrification unit E. This eliminates the need for mechanical mixers saving energy, maintenance and capital.

Additional embodiments of the invention provided novel anaerobic processes. Unit F is a long vertical channel which may converted to an anaerobic chamber for the purpose of creating VFA's. In the present invention there are no airlines or extraction lines in unit F. This allows the use of media such as open weave rope or tubes to be suspended in the reactor without the fear of plugging the channel or becoming entwined with other pipes. The purpose of the fixed media is to accumulate attached growth anaerobic bacteria (acid formers). The amount of fixed media and anaerobic biomass can be adjusted from the surface by rolling up a portion of the rope or fabric tube. The amount of media can be monitored on line by measuring the weight of the rope. The liquid velocity downward in channel 12 keeps excess biomass from forming and any excess will fall off. Since channel 12 is open at the bottom waste anaerobic biomass would collect in sump 67 and be removed th flotation tank Unit J.

In still additional embodiments, wasting sludge through an air line 66 or 69 provides instant spontaneous flotation upon depressurization. Wasting sludge [WAS] from a well aerated and mixed part of zone 1, a process not contemplated in previous designs, favours the capture of phosphate in the sludge. Float solids are suitable for digestion without any further thickening.

Although the foregoing invention has been described in detail by way of example for purposes of clarity of understanding, it will be apparent to the artisan that certain changes and modifications are comprehended by the disclosure and may be practiced without undue experimentation within the scope of the invention which is described herein by way of illustration not limitation. All publications, patents, and patent applications cited herein are hereby incorporated by reference in their entirety for all purposes.

What is claimed is:

1. A long vertical shaft bio-reactor for the purification of waste waters containing biodegradable organic matter comprising:

at least one primary downflow channel extending downward to a depth of approximately 70–90% of a total depth of the bio-reactor;

at least one primary upflow channel in fluid connection with said primary downflow channel defining a mixing zone located below a lower port of the primary downflow channel, said primary upflow channel partitioned by at least one partition, valve, or baffle into at least first and second superior upflow channels fluidly connected with said primary upflow channel;

said first superior upflow channel in fluid connection with said primary downflow channel through a first head tank, said first head tank fitted with a degassing plate to direct flow from said first superior upflow channel laterally to effectuate degassing;

a waste water influent channel fluidly connected with said first superior upflow channel;

a first fluid flow regulator operable to regulate fluid flow between said waste water influent channel and said first superior upflow channel;

said second superior upflow channel in fluid connection with a second head tank, said second head tank fitted with a degassing plate to direct flow from said second superior upflow channel laterally to effectuate degassing;

a recirculation channel fluidly connected with said second superior upflow channel;

a second fluid flow regulator operable to regulate fluid flow between said recirculation channel and said second superior upflow channel; and, a gas distribution port for distributing an oxygen-containing gas into said primary upflow channel to generate air-lift within said primary upflow channel.

2. The long vertical shaft bio-reactor of claim 1, wherein said primary upflow channel is partitioned by at least one diversion baffle located and configured to direct a predetermined fraction of said oxygen-containing gas rising in said primary upflow channel into one or more of said superior upflow channels, and to simultaneously divert a different fraction of total fluid flow into one or more of said superior upflow channels.

3. The long vertical shaft bio-reactor of claim 1, wherein a residence time of fluid in said primary upflow channel is adjustably controlled by diverting a predetermined fraction of said oxygen-containing gas rising in said primary upflow channel into one or more of said superior upflow channels, and simultaneously diverting a different fraction of total fluid flow into one or more of said superior upflow channels.

4. The long vertical shaft bio-reactor of claim 1, further comprising a recycle channel between said first head tank and said first superior upflow channel to optionally divert recycled, degassed fluid from said first head tank into said first superior upflow channel, wherein a residence time of fluid in said primary upflow channel is adjustably controlled in part by providing a diversion baffle located and configured to direct a predetermined fraction of said oxygen-containing gas rising in said primary upflow channel into one or more of said superior upflow channels, and to simultaneously divert a different fraction of total fluid flow into one or more of said superior upflow channels, and wherein said residence time of fluid in said primary upflow channel is further adjustably controlled in part by selectably adjusting a recycle flow rate between said recycle channel into said first superior upflow channel and or by selectably adjusting a recirculation flow rate between said recirculation channel and said second superior upflow channel.

5. The long vertical shaft bio-reactor of claim 1, wherein said waste water influent channel is fluidly connected with said first superior upflow channel by a downflow channel connecting to said first superior upflow channel by an upwardly directed port.

6. The long vertical shaft bio-reactor of claim 1, wherein said recirculation channel is fluidly connected with said second superior upflow channel by a downflow channel connecting to said second superior upflow channel by an upwardly directed port.

7. The long vertical shaft bio-reactor of claim 1, wherein said second head tank is fitted with a discharge device to optionally discharge effluent from said second head tank.

8. The long vertical shaft bio-reactor of claim 7, further comprising a clarifier to which said effluent is optionally discharged from said second head tank.

9. The long vertical shaft bio-reactor of claim 1, wherein a residence time of fluid in said primary upflow channel is adjustably controlled to approximately match an oxygen supply rate in said bio-reactor with an oxygen up-take rate by a biomass of microorganisms in said bio-reactor.

10. The long vertical shaft bio-reactor of claim 1, wherein voidage control in the bio-reactor is effectively achieved by regulating an amount of degassed recycle fluid flow between said second head tank and said second superior upflow channel.

11. The long vertical shaft bio-reactor of claim 1, wherein voidage control is effectively achieved by regulating an amount of degassed recycle flow between said second head tank and said second superior upflow channel without altering a flow of oxygen-containing gas into said primary upflow channel.

12. The long vertical shaft bio-reactor of claim 1, wherein a residence time of fluid in said primary upflow channel is adjustably controlled by adjusting voidage through regulating an amount of degassed recycle flow between said second head tank and said second superior upflow channel.

13. The long vertical shaft bio-reactor of claim 1, wherein flow of oxygen-containing gas into one or more of said superior upflow channels is adjustable independent of fluid flow rate into said one or more superior upflow channels.

14. The long vertical shaft bio-reactor of claim 1, wherein flow of oxygen-containing gas into said first superior upflow channel is adjustable independent of fluid flow rate into said first superior upflow channel.

15. The long vertical shaft bio-reactor of claim 1, wherein flow of oxygen-containing gas into said second superior upflow channel is adjustable independent of fluid flow rate into said second superior upflow channel.

16. The long vertical shaft bio-reactor of claim 1, wherein recycling or recirculation of degassed fluid from said first and/or second head tank into said first and/or second superior upflow channel(s) is adjustably controlled by a system microprocessor-controlled or manual-controlled valve or baffle actuator.

17. The long vertical shaft bio-reactor of claim 1, further comprising a sedimentation clarifier.

18. The long vertical shaft bio-reactor of claim 1, further comprising a polishing biofilter.

19. The long vertical shaft bio-reactor of claim 1, further comprising a disenfection chamber.

20. The long vertical shaft bio-reactor of claim 1, further comprising means for returning settled activated sludge into said bioreactor.

21. The long vertical shaft bio-reactor of claim 1, further comprising attachment media for attachment of microorganisms fixed or circulating within said second head tank and/or within said first superior upflow channel.

22. The long vertical shaft bio-reactor of claim 1, further comprising a self-batching air lock interposed between said first and second superior upflow channels.

23. The long vertical shaft bio-reactor of claim 1, further comprising waste solids extraction means for extracting waste solids from a lower portion of the bio-reactor.

24. The long vertical shaft bio-reactor of claim 1, further comprising a shear header or bubble distribution mechanism operably integrated with said gas distribution port to enhance mixing and/or bubble generation in said mixing zone.

25. The long vertical shaft bio-reactor of claim 1, which is selectably operable to provide a substantially anaerobic environment in said primary downflow channel and said first superior upflow channel.

26. The long vertical shaft bio-reactor of claim 1, which can be adjusted to provide a substantially anaerobic environment in said primary downflow channel and said first superior upflow channel, wherein operation of the bio-reactor in this mode provides for a final step of nutrient processing including denitrification of nitrate.

27. The long vertical shaft bio-reactor of claim 1, which is adjustable to provide enhanced nitrification processes in a second treatment zone defined by said second superior upflow channel and said second head tank interconnected by said recirculation channel.

28. The long vertical shaft bio-reactor of claim 27, further comprising fixed or moving attachment media in said second treatment zone to further enhance said nitrification processes.

29. The long vertical shaft bio-reactor of claim 1, which is adjustable to provide enhanced nitrification in a second treatment zone defined by said second superior upflow channel and said second head tank interconnected by said recirculation channel, said nitrification processes driven at least in part by channeling of unspent gas from said primary upflow channel into said second superior upflow channel.

30. The long vertical shaft bio-reactor of claim 1, which features a modular reactor component having a central conduit surrounded by one or more channel-forming radial partition(s).

31. The long vertical shaft bio-reactor of claim 29, wherein said unspent gas is high in carbon dioxide which provides a source of inorganic carbon to drive said nitrification processes.

32. A long vertical shaft bio-reactor for the purification of waste waters containing biodegradable organic matter comprising:

at least one primary downflow channel extending downward to a depth of approximately 70–90% of a total depth of the bio-reactor;

at least one primary upflow channel in fluid connection with said primary downflow channel defining a mixing zone located below a lower port of the primary downflow channel, said primary upflow channel partitioned by at least one partition, valve, or baffle into at least first and second superior upflow channels fluidly connected with said primary upflow channel;

said first superior upflow channel in fluid connection with said primary downflow channel through a first head tank, said first head tank fitted with a degassing plate to direct flow from said first superior upflow channel laterally to effectuate degassing;

a waste water influent channel fluidly connected with said first superior upflow channel;

a first fluid flow regulator operable to regulate fluid flow between said waste water influent channel and said first superior upflow channel;

said second superior upflow channel in fluid connection with a second head tank, said second head tank fitted with a degassing plate to direct flow from said second superior upflow channel laterally to effectuate degassing;

a recirculation channel fluidly connected with said second superior upflow channel;

a second fluid flow regulator operable to regulate fluid flow between said recirculation channel and said second superior upflow channel; and, a gas distribution port for distributing an oxygen-containing gas into said primary upflow channel to generate air-lift within said primary upflow channel, wherein said first superior upflow channel and said first head tank partially define a first treatment zone and said second superior upflow channel and said second head tank partially define a second treatment zone.

33. The long vertical shaft bio-reactor of claim 32, wherein said first and second treatment zones are structurally segregated to prevent substantial liquid transfer between said first and second treatment zones.

34. The long vertical shaft bio-reactor of claim 32, wherein said first and second treatment zones are structurally segregated by a self-batching air lock that functions to substantially prevent fluid transfer between said first and second treatment zones to minimize heat loss in the bio-reactor.

35. The long vertical shaft bio-reactor of claim 32, wherein said first treatment zone surrounds or is positioned adjacent to said second treatment zone.

36. The long vertical shaft bio-reactor of claim 32, wherein said first treatment zone further comprises said primary downflow channel and said primary upflow channel.

37. The long vertical shaft bio-reactor of claim 32, wherein said second treatment zone is surrounded by a second sealed outer wall to minimize heat loss from the bio-reactor to surrounding geological materials.

38. The long vertical shaft bio-reactor of claim 32, wherein each of said first and second treatment zones comprise independent aeration means.

39. The long vertical shaft bio-reactor of claim 32, wherein each of said first and second treatment zones comprise an upper circulating zone and a lower pseudo plug flow zone.

40. The long vertical shaft bio-reactor of claim 32, wherein deoxygenation in said first treatment zone can be achieved without mechanical mixers.

41. The long vertical shaft bio-reactor of claim 32, wherein denitrification in said first treatment zone can be achieved without mechanical mixers.

* * * * *